US008959481B2

(12) United States Patent
Anand et al.

(10) Patent No.: US 8,959,481 B2
(45) Date of Patent: Feb. 17, 2015

(54) DETERMINING SYSTEM LEVEL DEPENDENCIES

(75) Inventors: Ashok Anand, Jharkhand (IN); Dipayan Gangopadhyay, San Jose, CA (US); Manish Gupta, New Delhi (IN); Manish Sethi, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1254 days.

(21) Appl. No.: 12/432,929

(22) Filed: Apr. 30, 2009

(65) Prior Publication Data

US 2010/0281455 A1 Nov. 4, 2010

(51) Int. Cl.
*G06F 9/44* (2006.01)
*G06F 9/445* (2006.01)

(52) U.S. Cl.
CPC .. *G06F 8/24* (2013.01); *G06F 8/35* (2013.01); *G06F 8/60* (2013.01); *G06F 8/20* (2013.01)
USPC ........... 717/121; 717/104; 717/105; 717/107; 717/116; 717/177; 717/102

(58) Field of Classification Search
USPC .................................. 717/102–105, 168–178
See application file for complete search history.

(56) References Cited

U.S. PATENT DOCUMENTS

| 5,261,100 | A | * | 11/1993 | Fujinami et al. | 717/122 |
|---|---|---|---|---|---|
| 6,405,364 | B1 | * | 6/2002 | Bowman-Amuah | 717/101 |
| 8,291,378 | B2 | * | 10/2012 | Arnold et al. | 717/120 |
| 2002/0103558 | A1 | * | 8/2002 | Iwamasa | 700/97 |
| 2002/0188430 | A1 | * | 12/2002 | Benny et al. | 703/7 |
| 2003/0182656 | A1 | * | 9/2003 | Leathers et al. | 717/177 |
| 2003/0195867 | A1 | * | 10/2003 | Nye | 707/1 |
| 2004/0015833 | A1 | * | 1/2004 | Dellarocas et al. | 717/106 |
| 2004/0181771 | A1 | * | 9/2004 | Anonsen et al. | 717/100 |
| 2004/0249482 | A1 | * | 12/2004 | Abu El Ata et al. | 700/44 |
| 2005/0044544 | A1 | * | 2/2005 | Slivka et al. | 717/174 |
| 2005/0050311 | A1 | | 3/2005 | Joseph et al. | |
| 2005/0055667 | A1 | * | 3/2005 | Beringer et al. | 717/108 |

(Continued)

FOREIGN PATENT DOCUMENTS

WO WO 2005/008389 A2 1/2005

OTHER PUBLICATIONS

Subramonian Venkita, Timed Automata Models for Principled Composition of Middleware, Doctoral Dissertation, May 2006.

(Continued)

*Primary Examiner* — Lewis A Bullock, Jr.
*Assistant Examiner* — Tina Huynh
(74) *Attorney, Agent, or Firm* — Ryan, Mason & Lewis, LLP

(57) ABSTRACT

Techniques for co-relating at least one of a functional design and at least one implementation artifact of a solution with at least one infrastructure component of a target deployment environment for the solution are provided. The techniques include obtaining at least one of a functional design and at least one implementation artifact of a solution, obtaining at least one infrastructure component of a target deployment environment for the solution, and co-relating at least one of a functional design and at least one implementation artifact of a solution with at least one infrastructure component of a target deployment environment for the solution, wherein co-relating comprises discovering at least one system level dependency among the at least one of a functional design and at least one implementation artifact and the at least one infrastructure component.

18 Claims, 18 Drawing Sheets

(56) References Cited

U.S. PATENT DOCUMENTS

| | | | |
|---|---|---|---|
| 2005/0091346 A1 | 4/2005 | Krishnaswami et al. | |
| 2005/0132350 A1* | 6/2005 | Markley et al. | 717/168 |
| 2005/0138160 A1* | 6/2005 | Klein et al. | 709/223 |
| 2006/0036752 A1 | 2/2006 | Lei et al. | |
| 2006/0106585 A1* | 5/2006 | Brown et al. | 703/1 |
| 2006/0225032 A1* | 10/2006 | Klerk et al. | 717/105 |
| 2007/0118551 A1* | 5/2007 | Akkiraju et al. | 707/102 |
| 2007/0265814 A1* | 11/2007 | Moore et al. | 703/10 |
| 2008/0052675 A1* | 2/2008 | Wookey | 717/120 |
| 2009/0013162 A1* | 1/2009 | Nandan et al. | 713/1 |
| 2011/0296375 A1* | 12/2011 | Mooney | 717/106 |

OTHER PUBLICATIONS

Harkema et al., Middleware Performance: A Quantitative Modeling Approach, In Proc. of the 2004 Symposium on Performance Evaluation of Computer Telecommunications System, San Jose, California, 2004.

Chen et al., Performance Prediction of Component-Based Applications, Journal of System and Software, vol. 74/1, pp. 35-43, 2005.

Agarwal et al., Problem Determination Using Dependency Graphs and Run-Time Behavior Models, International Workshop on Distributed Systems: Operations and Management, Davis, CA, USA, Nov. 15-17, 2004.

Jacobson et al., Analyzing queueing networks with simultaneous resource possession, Comm. of the ACM, vol. 125, No. 2, 1982, pp. 142-151.

Bernauer et al. Representing XML Schema in UML—A Comparison of Approaches, Lecture Notes in Computer Science, vol. 3140, pp. 440-444, 2004.

Maghraoui et al., Model Driven Provisioning: Bridging the Gap Between Declarative Object Models and Procedural Provisioning Tools, ACM/IFIP/USENIX 7th International Middleware Conference (Middleware 2006), Melbourne, Australia, Nov. 2006.

Garbani et al., Application Mapping and the CMDB, Q4 2006 Update, Forrester Research, Inc., Dec. 2006, http://www.forrester.com/Research/Document/Excerpt/0,7211,40746,00.html.

Barsalou et al., M(DM): An Open Framework for Interoperation of Multimodel Multidatabase Systems, Proceedings of the Eighth International Conference on Data Engineering, Tempe, Arizona, Feb. 3-7, 1992.

CIMOSA: CIM Open System Architecture, downloaded Dec. 1, 2006.

Schmitd et al., CoSMIC: An MDA Generative Tool for Distributed Real-Time and Embedded Component Middleware and Applications, downloaded Jan. 21, 2010.

Nejdl et al., Semantic Web and Peer-to-Peer Technologies for Distributed Learning Repositories. IFIP 17th World Computer Con 2002.

Java 2 Platform, Enterprise Edition (J2EE): XML Schemas for J2EE Deployment Descriptors. Nov. 24, 2003.

XML Schema. Sep. 12, 2005.

Hughes et al., QoS Explorer: A Tool for Exploring QoS in Composed Services, downloaded Jan. 21, 2010. Jun. 21, 2002.

Jin et al., Analysis on Service Level Agreement of Web Services, http://www.hpl.hp.com/techreports/2002/HPL-2002-180.html. Downloaded Jan. 12, 2010.

XSB prolog, http://xsb.sourceforge.net/ downloaded Jan. 12, 2010.

Object Management Group UML 2.0 Superstructure Specification formal/May 7, 2004. Aug. 2005.

XML Schema, WWW Consortium, W3C Recommendation, http://www.w3.org/XML/Schema. downloaded Jan. 12, 2010.

Business Process Execution Language for Web Services version 1.1, http://www.ibml.com/developerworks/library/specification/wsbpel/ May 5, 2003.

WWW Consortium, Web Services Description Language (WSDL) Version 2.0 Part 1: Core Language W3C Candidate Recommendation Mar. 27, 2006, http://www.w3.org/TR/wsdl20/ downloaded Jan. 12, 2010.

IBM WebSphere Developer Technical Journal, Building SOA solutions with the Service Component Architecture, http://www.ibm.com/developerworks/websphere/techjournal/0510_brent/0 Oct. 26, 2005.

Java™ 2 Platform Enterprise Edition Specification, v1.4, http://java.sun.com/j2ee/j2ee-1_4-fr-spec.pdf Nov. 24, 2003.

JSR 77: J2EE Management, http://jcp.org/en/jsr/detail?id=077 downloaded Jan. 12, 2010.

Document Object Model Core, http://www.w3.org/TR/DOM-Level-3-Core/core.html. Apr. 7, 2004.

JSR 109: Implementing Enterprise Web Services, http://jcp.org/en/jsr/detail?id=109. Downloaded Jan. 12, 2010.

WWW Consortium, XQuery 1.0: An XML Query Language, W3C Recommendation, http://www.w3.org/TR/xquery/ Downloaded Jan. 12, 2010.

IBM Tivoli Change and Configuration Management Database (CCMDB), http://www.ibm.com/software/tivoli/products/ccmdb/ downloaded Jan. 12, 2010.

Application Response Measurement—ARM, http://www.opengroup.org/tech/management/arm/ downloaded Jan. 12, 2010.

Bezivin et al., Applying MDA approach for Web service platform, Proceedings of the 8th International IEEE Enterprise Distributed Object Computing Conference (EDOC'04). IEEE CS press, Monterey, California, USA, pp. 58-70. Downloaded Jan. 21, 2010.

\* cited by examiner

FIG. 5
STITCHING METHODOLOGY: EXAMPLE (1): webservices.xml  _502_

```xml
<?xml-version="1.0" encoding="UTF-8" ?>
-<webservices xmlns="http://java.sun.com/xml/ns/j2ee"
    xmlns:xsi="http://www.w3.org/2001/XMLSchema-instance" version="1.1"
    xsi:schemaLocation="http://java.sun.com/xml/ns/j2ee
    http://www.ibm.com/webservices/xsd/j2ee_web_services_1_1.xsd">
  -<webservice-description>
      <webservice-description-name>BombMeJavaBeanService
      </webservice-description-name>
      <wsdl-file>WEB-INF/wsdl/BombMeJavaBean.wsdl</wsdl-file>
      <jaxrpc-mapping-file>WEB-INF/BombMeJavaBean_mapping.xml
      </jaxrpc-mapping-file>
    -<port-component>
        <port-component-name>BombMeJavaBean</port-component-name>
        <wsdl-port xmlns:pfx="http://man">pfx:BombMeJavaBean</wsdl-port>
        <service-endpoint-interface>man.BombMeJavaBean
        </service-endpoint-interface>
      - <service-impl-bean>
          <servlet-link>man_BombMeJavaBean</servlet-link>
        </service-impl-bean>
      </port-component>
    </webservice-description>
  - <webservice-description>
      <webservice-description-name>BombMeJavaBean1Service
      </webservice-description-name>
      <wsdl-file>WEB-INF/wsdl/BombMeJavaBean1.wsdl</wsdl-file>
      <jaxrpc-mapping-file>WEB-INF/BombMeJavaBean1_mapping.xml
      </jaxrpc-mapping-file>
    -<port-component>
        <port-component-name>BombMeJavaBean1</port-component-name>
        <wsdl-port xmlns:pfx="http://man">pfx:BombMeJavaBean1</wsdl-port>
        <service-endpoint-interface>man.BombMeJavaBean1</service-endpoint-interface>
      - <service-impl-bean>
          <servlet-link>man_BombMeJavaBean1</servlet-link>
        </service-impl-bean>
      </port-component>
    </webservice-description>
</webservices>
```

■? element('port-componet', E, _, model ('Webservices.xml',MSN,location(Machine, Path))).
  Result> E =\webservice\webservice-description[\webservice-description-
    name=BombMeJavaService]\portcomponent[\port-component-
    name=BombMeJavaBean].
  Result> E =\webservices\webservice-description[\webservice-description-
    name=BombMeJavaBean1Service]\portcomponent[\port-component-
    name=BombMeJavaBean1].

FIG. 6

STITCHING METHODOLOGY: EXAMPLE (2): BombMeJavaBean.wsdl  ⟵ 602

```xml
<?xml.version"1.0" encoding="UTF-8" ?>
- <wsdl:definitions targetNamespace="http://man" xmlns:impl="http://man"
    xmlns:intf="http://man" xmlns:wsdl="http://schemas.xmlsoap.org/wsdl/"
    xmlns:wsdlsoap="http://schemas.xmlsoap.org/wsdl/soap/"
    xmlns:wsi="http://ws-i.org/profiles/basic/1.1/xsd"
    xmlns:xsd="http://www.w3.org/2001/XMLSchema">
 + <wsdl:types>
 + <wsdl:message name ="sendMessageResponse">
 + <wsdl:message name ="sendMessageRequest">
 - <wsdl:portType name ="BombMeJavaBean">
   - <wsdl:operation name ="sendMessage">
      <wsdl:input message ="Impl:sendMessageRequest"
         name ="sendMessageRequest" />
      <wsdl:output message ="impl:sendMessageResponse"
         name ="sendMessageResponse" />
    </wsdl:operation>
  </wsdl:portType>
 - <wsdl:binding name="BombMeJavaBeanSoapBinding" type ="impl:BombMeJavaBean">
    <wsdlsoap:binding style ="document"
       transport ="http://schemas.xmlsoap.org/soap/http" />
   - <wsdl:operation name ="sendMessage">
      <wsdlsoap:operation soapAction="" />
     - <wsdl:input name ="sendMessageRequest">
        <wsdlsoap:body use ="literal" />
      </wsdl:input>
     - <wsdl:output name ="sendMessageResponse">
        <wsdlsoap:body use ="literal" />
      </wsdl:output>
    </wsdl:operation>
  </wsdl:binding>
 - <wsdl:service name ="BombMeJavaBeanService">
   - <wsdl:port binding ="impl:BombMeJavaBeanSoapBinding" name ="BombMeJavaBean">
      <wsdlsoap:address location =
        "http://localhost:9080/BombWSJavaBean/services/BombMeJavaBean" />
    </wsdl:port>
  </wsdl:service>
</wsdl:definitions>
```

■ ? element('port', E, _, model ('wsdl' , MSN,location(Machine, Path))).
   Result>
      E=\definitions\service[@name=BombMeJavaBeanService]
      \ port[@name=http://man:BombMeJavaBean].

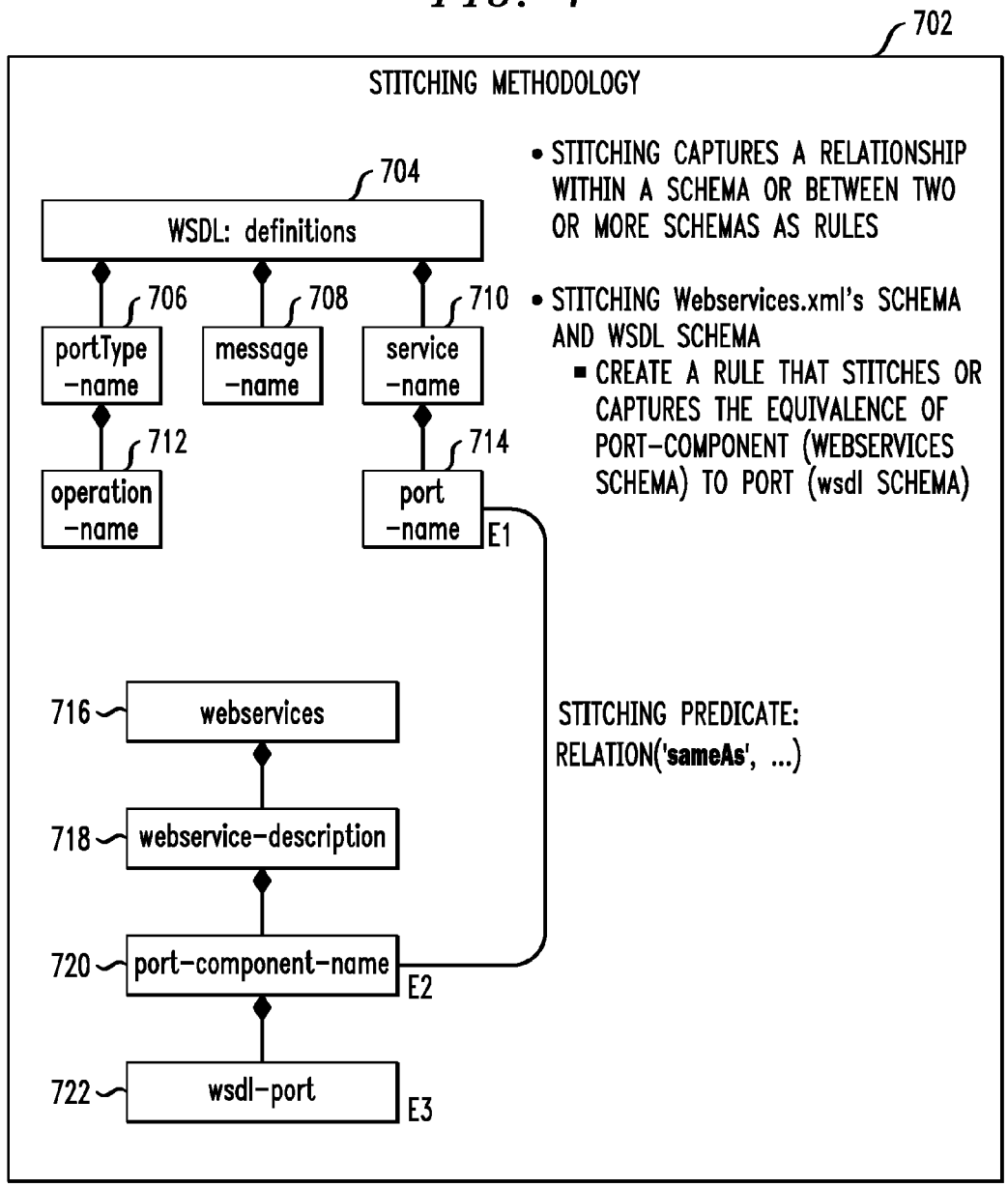

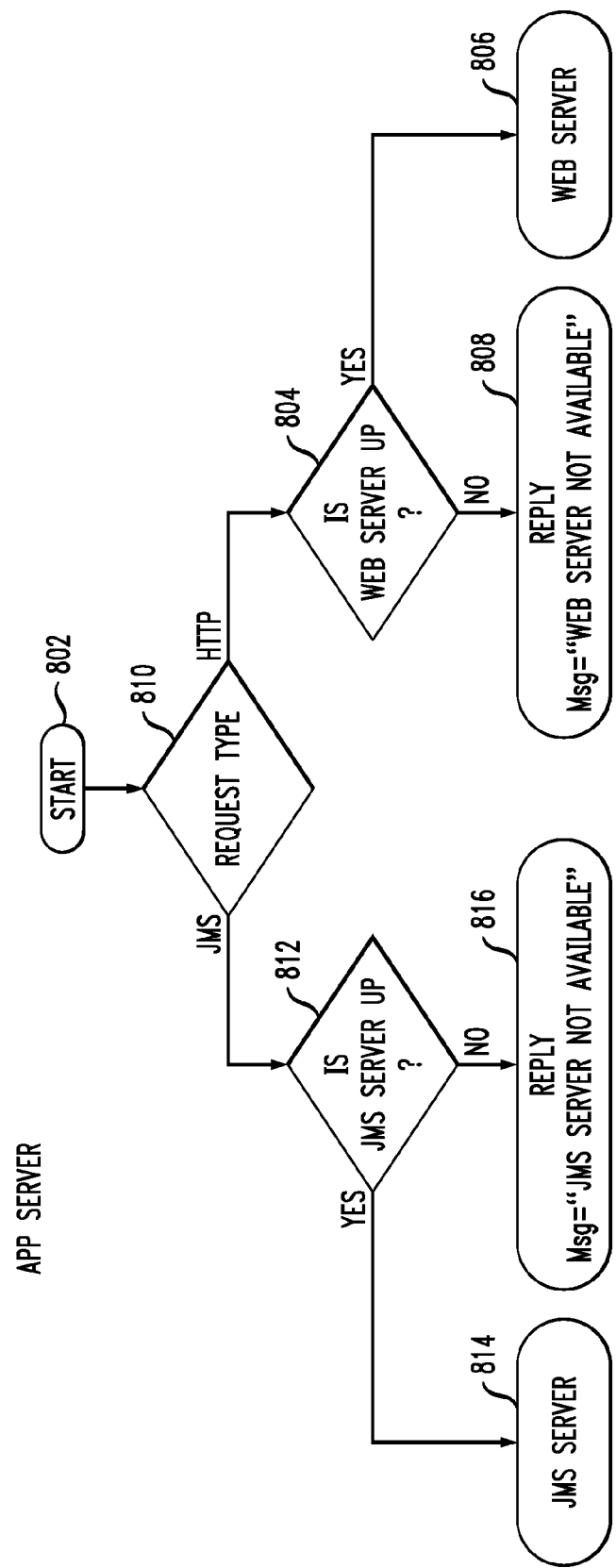

```
Path isRelated (E1:ET1, M1:Model, E2:ET2, M2:Model) {

1. Find a Model M1 such that element type ET1 is in Model M1 and a model M2 such that element type E2 is in Model M2

2. Find a model level path P from element type ET1 in Model M1 to element type ET2 in Model M2 by first traversing relationships in Model M1 starting from ET1, then through inter-model Stitching relationships from Model M1 through zero or more intermediate models Mj to Model M2, and then through the relationships in Model M2 ending with element type ET2;

// Path P is an ordered list of relationship definitions of the form Rk(ETi, ETi+1) where the relationship Rk is between
// element type ETi and element type ETi+1 in some model traversed during the construction of model level path P;

3. For every Element Type ETi in the model level path P, locate an element Ei of Element Type ETi in some Source Component Si such that ETi is in some Model Mi, and source Si is an instance of Model Mi;
// The Source Adapter for a model is capable of locating source component instance
// of a model by searching an IT environment 4. Instantiate model level path P to get instantiated path P' by substituting E1 for ET1 and E2 for ET2 in the relationships in path P and for all other intermediate Element Types ETi in the relationships in P, by substituting each Element Type ETi by an corresponding instance element Ei found in step 4.

5. Check validity of the instantiated path P' such that the constraints of every relationship r(Ei,Ej) in path P' are satisfied by the properties of the elements Ei and Ej.

6. If the instantiated path P' is not valid, then go to step 3 to find another model level path P and repeat.

7. Return instantiated path P' as result; }
```

DETERMINING SYSTEM LEVEL DEPENDENCIES

FIELD OF THE INVENTION

Embodiments of the invention generally relate to information technology, and, more particularly, to enterprise systems.

BACKGROUND OF THE INVENTION

Information technology (IT)-enabled enterprise solutions typically provide solutions to some enterprise problems for an organization. Such solutions typically involve a large number of software components deployed on a network of servers and work-stations. For example, a related enterprise solution is a claim processing solution used by an insurance company, where insured members or their authorized delegates can submit claims for covered expenses according to their subscribed benefit plans and get reimbursement payments. Such solutions may involve web-based interfaces for interactive access to claim submitters, several work-station-based desktop interfaces for insurance company's claim reviewer users, a workflow or process automation component to coordinate activities of these reviewer users, and a set of components to store and retrieve records of claims, insured members' benefit plans, pre-set payment schedules for covered expenses, etc. All of these functional components may be deployed on a server infrastructure including middleware systems software, database management system software and networking software which, in turn, can run on operating systems managing computer hardware.

SUMMARY OF THE INVENTION

Embodiments of the present invention provide techniques for determining system-wide dependencies in an enterprise information technology (IT) system.

An exemplary method (which may be computer-implemented) for co-relating at least one of a functional design and at least one implementation artifact of a solution with at least one infrastructure component of a target deployment environment for the solution, according to one aspect of the invention, can include steps of obtaining at least one of a functional design and at least one implementation artifact of a solution, obtaining at least one infrastructure component of a target deployment environment for the solution, and co-relating at least one of a functional design and at least one implementation artifact of a solution with at least one infrastructure component of a target deployment environment for the solution, wherein co-relating comprises discovering at least one system level dependency among the at least one of a functional design and at least one implementation artifact and the at least one infrastructure component.

At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

These and other objects, features and advantages of the embodiments of the invention will become apparent from the following detailed description, which is to be read in connection with the accompanying drawings.

BRIEF DESCRIPTION OF THE DRAWINGS

FIG. 5 is a diagram illustrating exemplary stitching methodology, according to an embodiment of the present invention;

FIG. 6 is a diagram illustrating exemplary stitching methodology, according to an embodiment of the present invention;

FIG. 7 is a diagram illustrating exemplary stitching methodology, according to an embodiment of the present invention;

FIG. 8 is a diagram illustrating an exemplary implementation model of an application server, according to an embodiment of the present invention;

FIG. 17 is a diagram illustrating techniques for computing inter-component co-relations, according to an embodiment of the present invention;

DETAILED DESCRIPTION

Principles of the present invention include a systematic approach to automatically discover system level dependencies among applications and infrastructure components out of available heterogeneous information sources and constructing a multi-layered graph (referred to herein, for example, as an execution graph).

Additionally, principles of the invention include targeting the space of an enterprise computing environment involving a multitude of applications and heterogeneous infrastructural systems. One or more embodiments of the present invention synthesize multi-layered dependency models of such enterprise systems involving both models of already-deployed applications as well as applications not yet deployed. A meta-model stitching approach can be used, for example, to extend such a model synthesizer. Furthermore, synthesized models can be fed to multiple external tools for analyzing these models for quality of service (QoS) properties.

One or more embodiments of the present invention include co-relation of functional and/or design implementation artifacts with infrastructure components of target deployment environment. Also, one or more embodiments of the invention include an open-ended extensible meta-model stitching-based technology for achieving a co-relation of functional and/or design implementation artifacts with infrastructure components of target deployment environment, an aspect that can handle any type of target infra-structure environment. Additionally, one or more embodiments of the invention include execution models of middleware containers at multiple levels of granularity, an aspect that can extend from enterprise-level models through multiple layers of mapping to middleware and even deeper into an operating system (OS) and hardware.

While existing approaches model monitoring data of already deployed applications, one or more embodiments of the present invention include models of a system under observation. Also, in contrast to existing approaches, principles of the present invention relate application and infrastructure components, and reason about its run-time implications without even actually deploying the application. One or more embodiments of the invention consider the existing IT environment (for example, servers' topology, existing components deployed and running on those servers), which will share resources used by the new application. Additionally, unlike existing approaches, one or more embodiments of the invention are extensible, wherein one can specify a methodology to add new meta-models of any new infrastructure and stitching with existing ones. Also, in contrast to existing approaches, principles of the present invention span multiple levels of systems. This capability enables users to reason about the kind of queries that can be claimed across the execution stack.

Figure 1:
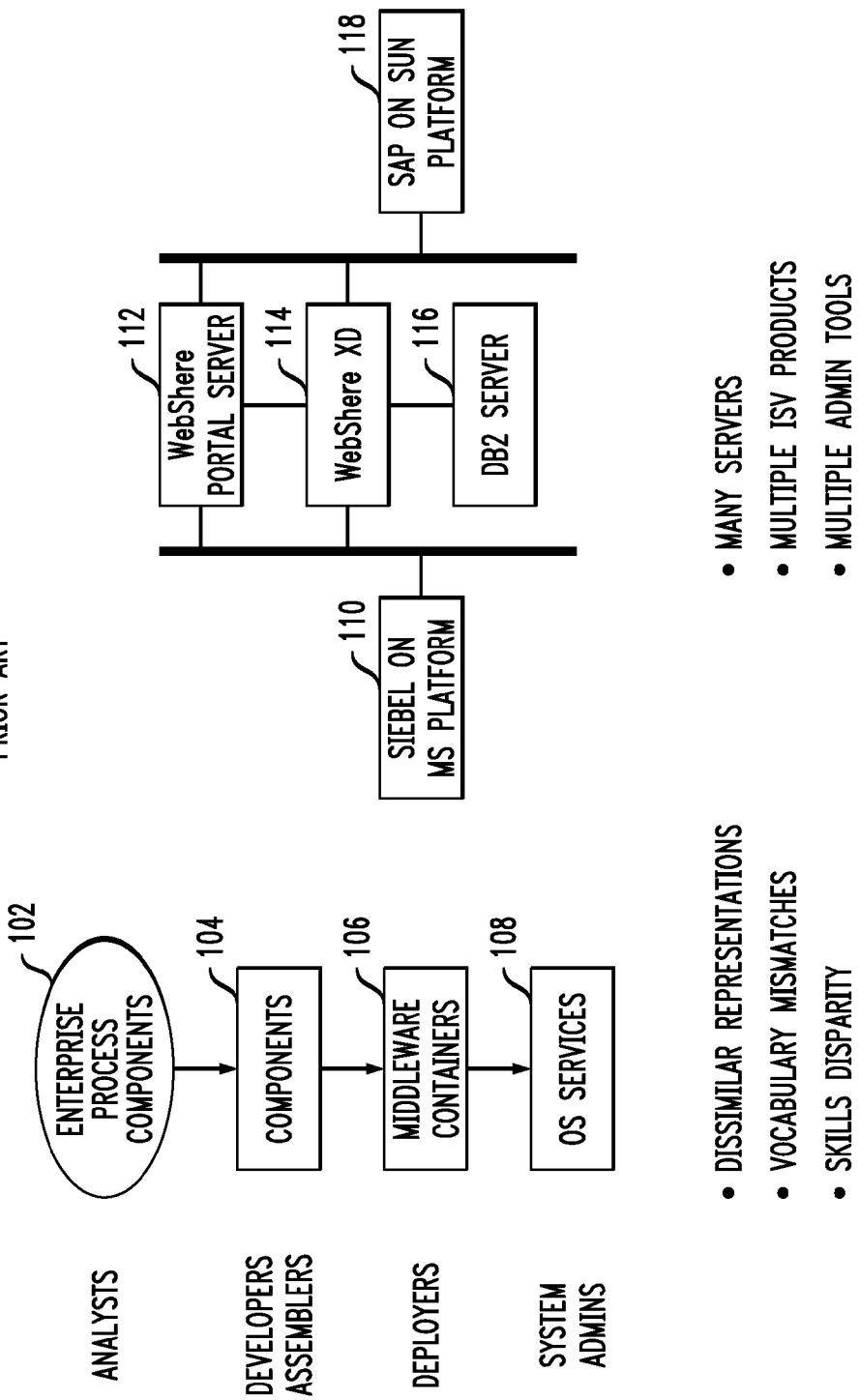
FIG. 1 is a diagram illustrating enterprise complexity, according to an embodiment of the present invention.

FIG. 1 is a diagram illustrating enterprise complexity, according to an embodiment of the present invention. By way of illustration, FIG. 1 depicts the elements of enterprise process components 102, components 104, middleware containers 106, OS services 108, Siebel on MS platform 110, WebSphere portal server 112, WebSphere extended deployment (XD) 114, DB2 server 116 and SAP on SUN platform 118. As illustrated by FIG. 1, without the "total picture," one does not know what "knob" to tweak. Many systems and many "knobs" can create a combinatorial explosion.

Figure 2:
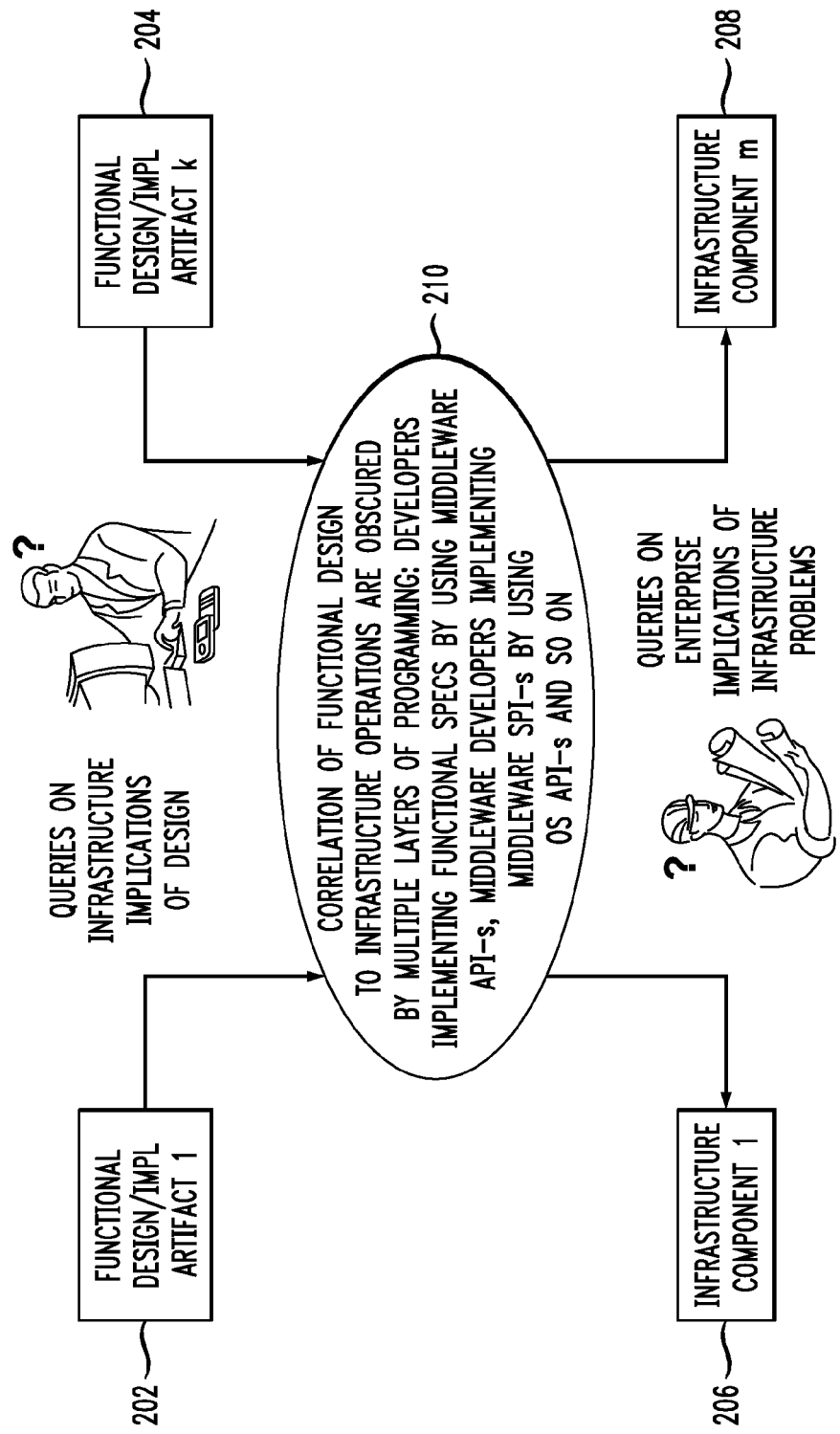
FIG. 2 is a diagram illustrating layers of programming decisions, according to an embodiment of the present invention.

FIG. 2 is a diagram illustrating layers of programming decisions, according to an embodiment of the present invention. By way of illustration, FIG. 2 depicts the elements of function design and/or implementation artifact one 202, functional design and/or implementation artifact k 204, infrastructure component one 206, infrastructure component m 208 and correlation component 210. As illustrated by FIG. 2, correlation of functional design to infrastructure operations are obscured in existing approaches by multiple layers of programming developers implementing functional specs by using middleware application programming interfaces (APIs), middleware developers implementing middleware serial peripheral interfaces (SPIs) by using OS APIs, etc.

Figure 3:
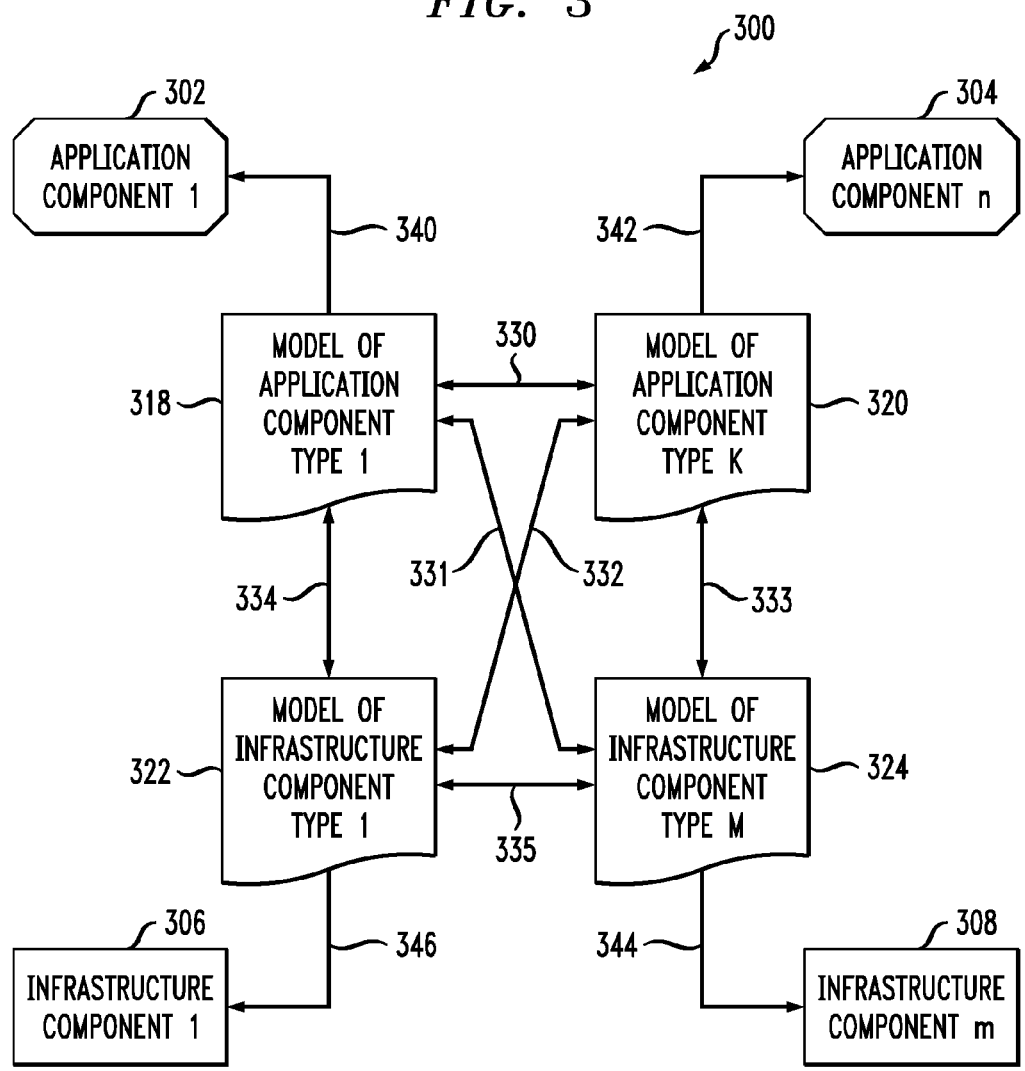
FIG. 3 is a diagram illustrating an implemented graph synthesizer, according to an embodiment of the present invention.

FIG. 3 is a diagram illustrating an execution graph synthesizer, according to an embodiment of the present invention. FIG. 3 depicts a schematic block diagram of an execution graph synthesizer in a typical enterprise IT environment. The environment 300 includes a plurality of functional application components, identified as application component 1 (that is, component 302) and application component n (that is, component 304). The system 300 also includes a plurality of infrastructure components identified as infrastructure component 1 (that is, component 306) and infrastructure component m (that is, component 308). The application components are deployed on infrastructure components and infrastructure components execute the application components. Each of the application and/or infrastructural components in a given enterprise IT environment can be generally referred to, for example, as a source component (or "source," in short).

In order to query the properties of the source components, their constituents and the relationships among them, one or more embodiments of the invention use an extensive knowledge base including models for each type of source component. By way of example, in FIG. 3, model of application component type 1 (that is, component 318) represents a model for which the application component 1 (that is, component 302) is an instance. Each model includes a set of element types and a set of relationship definitions among the element types. Additionally, the semantics of a relationship definition can be extended by one or more constraints between the participants of a relationship.

A constraint is a predicate relating the properties of the participating element types. A relationship between two elements in a source component is valid if and only if the types of the elements have a relationship definition in the model of the source component and all of the predicates in the constraints of the relationship definition are satisfied by the properties of the elements.

Locating source component instances for a given component type and querying the information of the instances from the model of the component type can be accomplished by source adapters. As depicted in FIG. 3, source adapter 340 can locate instances of the model of application component type 1 (that is, component 318) in the enterprise IT environment. Moreover, a source adapter is capable of querying elements in the source instance. Similarly, other source adapters (for example, 342, 344 and 346 in FIG. 3) can connect models of component types to their source instances in an IT environment (such as, for example, environment 300 in FIG. 3). As such, source adapters can connect models to actual sources.

In one or more embodiments of the invention, a model of a component can be defined in isolation as well as in relation to other existing models by stitching relationships, thereby extending an integrated model of an IT environment. In FIG. 3, stitching relationships 331 relate elements of model of application component type 1 (that is, component 318) with elements of model of infrastructure component type m (that is, component 324). Also, stitching relationships 330 relate elements of model of application component type 1 (that is, component 318) with elements of model of application component type k (that is, component 320). Stitching relationships 332 relate elements of model of application component type k (that is, component 320) with elements of model of infrastructure component type l (that is, component 322).

Further stitching relationships 333 relate elements of model of application component type k (that is, component 320) with elements of model of infrastructure component type m (that is, component 324). Stitching relationships 334 relate elements of model of application component type 1 (that is, component 318) with elements of model of infrastructure component type 1 (that is, component 322). Additionally, stitching relationships 335 relate elements of model of infrastructure component type 1 (that is, component 322) with elements of model of infrastructure component type m (that is, component 324).

The models of component types, the relationships within each model, the inter-model stitching relationships and the source adapter together include the ability to automatically discover and synthesize an integrated information base of applications and infrastructure in an enterprise IT environment. Out of such an integrated information base, several different types of queries can be answered. For example, finding all instance sources of a given component type or element thereof, and establishing relations between two instance level elements are typical queries of interest. Also, one or more embodiments of the invention include determining co-relations of design artifacts to their execution time implications. Likewise, observations from infrastructure can be co-related to their implications to functional design artifacts. As detailed herein, FIG. 17 provides techniques for computing the co-relations in terms of the schematic blocks of FIG. 3.

The techniques depicted in FIG. 17 compute a path from an instance element of a source component to another instance element of another source component, as an ordered list of instance-level relationships. By way of example, suppose that at the functional design level, one element of a design element calls another design element. For instance, a process step calls a web-service service, and one wants to know how the infrastructure level source components (for example, between a process server and an application server) will accomplish such a call. Given type models of processes, web-services, process servers and application servers, and the source adapters to find instances of these type models from the IT system, the techniques depicted in FIG. 17 will find one or more paths tracing how the call with be executed at run-time.

An illustrative embodiment of the invention includes semantic integration of information in design artifacts with information from deployment infrastructure. This not only provides a single place to access a total picture, but also queries like resource consumptions, and enables deployment decisions to be answered. One or more embodiments of the present invention also include open-ended extensible meta-model stitching techniques applied for analyzing QoS properties and system management concerns back to an enterprise level, as well as creating models of behavior of middleware containers.

As described herein, models of design artifacts can be semantically integrated with models of deployment infrastructure such that queries about resource consumption implementations of functional design artifacts and their deployment decisions can be answered, and queries about functional implementations of infrastructure problems or observations can be answered. As noted above, existing approaches contrastingly include design models and infrastructure models that are scattered all over in multiple design tools, middleware administration tools and deployment descriptors and in multiple forms.

One or more embodiments of the present invention include semantic integration achieved by a meta-model stitching approach where multiple meta-models for artifacts can be added. Multiple meta-models can be stitched by defining relationships among elements if elements from different meta-models are deemed to be semantically related. Additionally, one or more embodiments of the invention include an open-ended, extensible approach rather than enforcing a single standard. Meta-models can be, for example, fewer than the models in the presence of a multitude of system components and from multiple vendors and models of various design artifacts. Model-weaving papers can exist in a model-driven architecture community, but principles of the present invention uniquely adapt the techniques for analyzing QoS properties and mapping systems management concerns back to an enterprise level. Also, one or more embodiments of the invention create models of resources and behavior of middleware containers.

Figure 4:
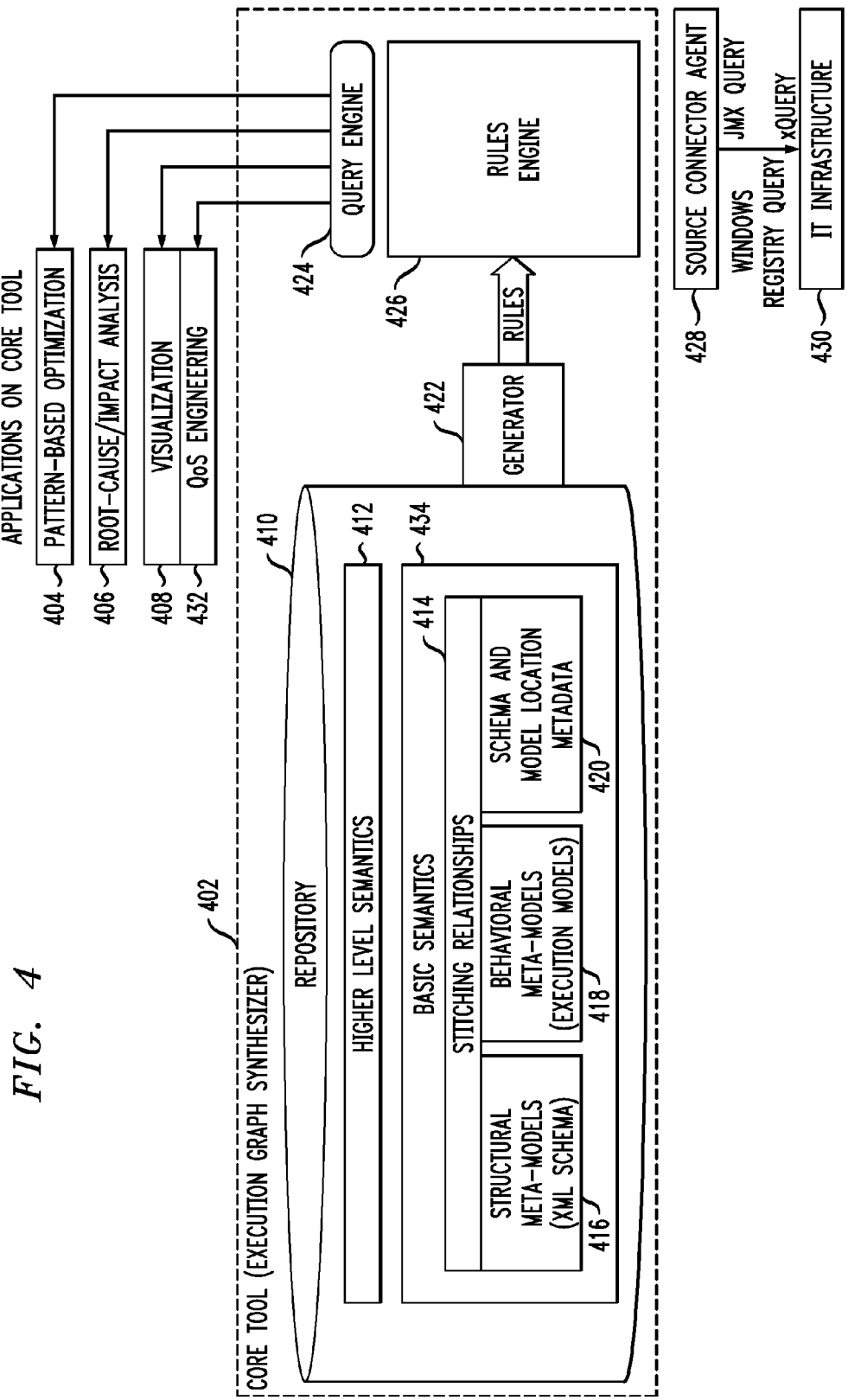
FIG. 4 is a diagram illustrating tool architecture, according to an embodiment of the present invention.

FIG. 4 is a diagram illustrating tool architecture, according to an embodiment of the present invention. By way of illustration, FIG. 4 depicts an execution graph synthesizer 402 which includes the elements of a repository 410, a generator 422, a query engine 424 and a rules engine 426. A repository 410 can include, for example, the elements of higher level semantics 412, basic semantics 434 which includes the elements of stitching relationships 414, structural meta-models (extensible markup language (XML) schema) 416, behavioral meta-models (execution models) 418 and schema and model location meta-data 420. FIG. 4 also depicts the elements of pattern-based optimization 404, root-cause and/or impact analysis 406, visualization 408, QoS engineering 432, source connector agent 428 and IT infrastructure 430.

FIG. 4 depicts a preferred embodiment of the disclosed system for service-oriented architecture (SOA) applications running on J2EE middleware. The core tool 402 in FIG. 4 is an exemplary embodiment of execution graph synthesizer. The potential applications on this core tool 402 can in essence query the integrated models of SOA applications and their target infrastructure (for example, the middleware servers). Examples of such applications on this core tool can include a visualizer 408, QoS engineering 432, root-cause analysis 406 and pattern-based optimizer 404.

The core tool 402 can be initialized, for example, with the following types of meta-models which are typically extensible markup language (XML) schema. Meta-models can be used to generate rules for accessing model elements (for example, a "port" element in a web service definition language (wsdl) file). Behavioral meta-models can be used to generate rules that capture run-time behavior (data and control flow) of middleware artifacts (such as execution containers). Performance models can also be included therein. Location meta-models can be used to generate rules that provide information about how to locate a model and/or artifact in an IT infrastructure (for example, EAR packaging information).

Stitching relationships 414 are the rules that define semantic equivalence between meta-model elements (for example, "port" in a wsdl file is equivalent to "port-component" in webservices.xml). Meta-models and stitching relationships collectively define the basic concepts and their semantics. Higher level relationships and concepts, such as a web-service is "implementedBy" an enterprise JavaBeans (EJB), can be added as implicational rules over the basic concepts and existing higher level concepts.

The executable rule language chosen in an illustrative embodiment can be, for example, Prolog. A generator 422 can be a program that translates meta-models into Prolog rules and loads them into Prolog rules engine (for example, 426). As an illustration of an application on top the core tool 404, consider the visualizer application 408. For an SOA application targeted for a J2EE environment, some typical queries that the visualizer needs answers for can include, for example, ListOfAllWSDLs, ListOfAllServlets, ListOfAllPossibleRelationships, ListOfResourcesThatOccurOnPath, etc.

A query engine 424 can receive such queries from the applications (for example, visualizer 408) and route them to the rules engine 426. A rules engine 426 can process the queries from the user against the loaded rules. If query processing in the rules engine results in a need to access model elements, then the request is routed to an appropriate source connector agent 428 which ultimately maps it to the appropriate query on the model (for example, Java management extensions (JMX) query, xQuery, etc.). Capabilities of a source connector agent 428 accessing server components can include, for example, finding value corresponding to given windows registry key (for example, used to find the software installation location), executing Xquery on an XML file, and executing a Java management extensions (JMX) query on a JMX engine. Examples of pieces of various components of core-tool architecture are detailed below.

Exemplary Prolog code to access element can include, for example:

```
element('wsdl-file', Element, ElementShortName,
model('Webservices.xml',
ModelShortName, location(MachineName, PathToModel)))
    :- model('Webservices.xml', ModelShortName,
location(MachineName, PathToModel)),
        XQuery = 'declare namespace
j2ee="http://java.sun.com/xml/ns/j2ee"; for $x in
/j2ee:webservices/j2ee:webservice-description let $y:=
$x/j2ee:webservice-description-name/text( ) let $z:=
$x/j2ee:wsdl-file/text( ) return <data>/webservices/webservice-
description[webservice-description-name={$y}]/wsdl-file={$z}</data>',
        getXMLElement(Element, ElementShortName, MachineName,
PathToModel, XQuery).
```

Definitions of predicates can, for example, include:
model(Metamodel,ModelShortName,location(MachineName,PathToModel)): This predicate returns true if there is an instance of Meta-model located in machine at the path specified by 'MachineName' and 'PathToModel' respectively. ModelShortName is a short name for the instance.
getXMLElement(Element,ElementShortName, MachineName, PathToModel, Xquery): In this predicate, 'Element' contains the result obtained by xquery specified by 'Xquery' on XML file located at machine ('MachineName') and path('PathToModel). 'ElementShortName' stands for the short name of 'Element'.
element(Tag,Element,ElementShortName,model(Metamodel,ModelShortName,location(MachineName, PathToModel): In this predicate, 'Element' stands for the model element corresponding to Tag (e.g. 'wsdl-file') and model specified by the predicate model(Metamodel,ModelShortName,location(MachineName, PathToModel)). Here, also, 'ElementShortName' stands for the short name of 'Element'.

Stitching between meta-models can include, for example, the following. Consider meta-models of wsdl and webservices.xml (both models can be found in any J2EE application package which provides web services). An element named 'port' in 'wsdl' and an element named 'port-component-name' in webservices.xml are related to each other under some conditions, which one can express as rule. Also, one can express that rule in prolog by the following example.

Exemplary Prolog code to access element can include, for example:

```
relation( 'sameAs',
        element('port.name', Element1, ElementShortName1,
            model('wsdl', ModelShortName1, location(MachineName,
            PathToModel1))), element('wsdl-port', Element2,
            ElementShortName2, model('Webservices.xml',
            ModelShortName2, location(MachineName, PathToModel2)))
```

-continued

```
)
:- element('port.name', Element1, ElementShortName1, model('wsdl',
ModelShortName1, location(MachineName, PathToModel1))),
        element('wsdl-port', Element2, ElementShortName2,
model('Webservices.xml', ModelShortName2,
location(MachineName, PathToModel2))),
        relation('belongsTo', model('wsdl', ModelShortName1,
location(MachineName, PathToModel1)), model('Webservices.xml',
ModelShortName2,
location(MachineName, PathToModel2))),
        ElementShortName1 = ElementShortName2.
```

Definitions of predicates can, for example, include:
relation('sameAs',X,Y): If X and Y are form of element predicates (for example, element('port.name',E1,ESN1, model('wsdl',M1,location(M,P))) etc.), this predicate returns true when element corresponding to X and element corresponding to Y relates to same element, but describe different aspects of it.
relation('belongsTo', X,Y): If X and Y are forms of model predicates, this predicate returns true when a model corresponding to X belongs to a model corresponding to Y by model location rules.

FIG. 5 is a diagram illustrating exemplary stitching methodology 502, according to an embodiment of the present invention. FIG. 5 depicts the example of webservices.xml. FIG. 6 is a diagram illustrating exemplary stitching methodology 602, according to an embodiment of the present invention. FIG. 6 depicts the example of BombMeJavaBean.wsdl.

FIG. 7 is a diagram illustrating exemplary stitching methodology 702, according to an embodiment of the present invention. By way of example, FIG. 7 depicts the elements of WSDL: definitions 704, portType name 706, message name 708, service name 710, operation name 712, port name 714, web-services 716, web-service description 718, port-component name 720 and wsdl-port 722. As depicted in FIG. 7, stitching captures a relationship within a schema or between two or more schemas as rules. Also, stitching webservices.xml's schema and WSDL schema, for example, create a rule that stitches or captures the equivalence of port-component (web-services schema) to port (wsdl schema).

Higher level relationships, as described herein, can be expressed as rules. For example, Prolog code to access an element can include the following:

```
relation( 'implementedBy',
            element('port.name', Element1, ElementShortName1,
            model('wsdl', ModelShortName1, location(MachineName,
            PathToModel1))), element('servlet-link', Element2,
            ElementShortName2, model('Webservices.xml',
            ModelShortName2, location(MachineName, PathToModel2)))
    ) :-
relation( 'sameAs', element('port.name', Element1, ElementShortName1,
model('wsdl', ModelShortName1, location(MachineName,
PathToModel1))),
            element('wsdl-port', Element3, ElementShortName3,
model('Webservices.xml', ModelShortName2, location(MachineName,
PathToModel2)))
            ), element('servlet-link', Element2, ElementShortName2,
model('Webservices.xml', ModelShortName2, location(MachineName,
PathToModel2))),
            relation('patentInTree', F, Element2),
            relation('patentInTree', G, F),
relation('patentInTree', G, Element3).
```

Definitions of predicates can, for example, include:
relation('implementedBy', X, Y): If X and Y are forms of an element predicate, this predicate returns true when the element corresponding to X is implemented by the element corresponding to Y. relation('patentInTree',X,Y): This predicate returns true if X is the patent of Y in an xml tree.

Additionally, different granularities of behavior models of server components can be created. FIG. 8 is a diagram illustrating an exemplary execution model of an application server, according to an embodiment of the present invention. By way of example, FIG. 8 depicts the elements and/or steps of start 802, request type 810, asking if web server is up 804, web server 806, reply message="web server not available" 808, asking if the JMS server is up 812, Java message service (JMS) server 814 and reply message="JMS server not available" 816.

Illustrated in FIG. 8 is an example of a behavior model for an 'application server.' As illustrated in FIG. 8, oblong or circular nodes (for example, 808, 806, 802, 814 and 816) are the resources part of the application server container, and the diamond nodes (for example, 804, 810 and 812) are the decision boxes for deciding which path a particular request will execute. There is a 'start' node 802 and an 'end' node, and the edges correspond to the control flow.

Figure 9:
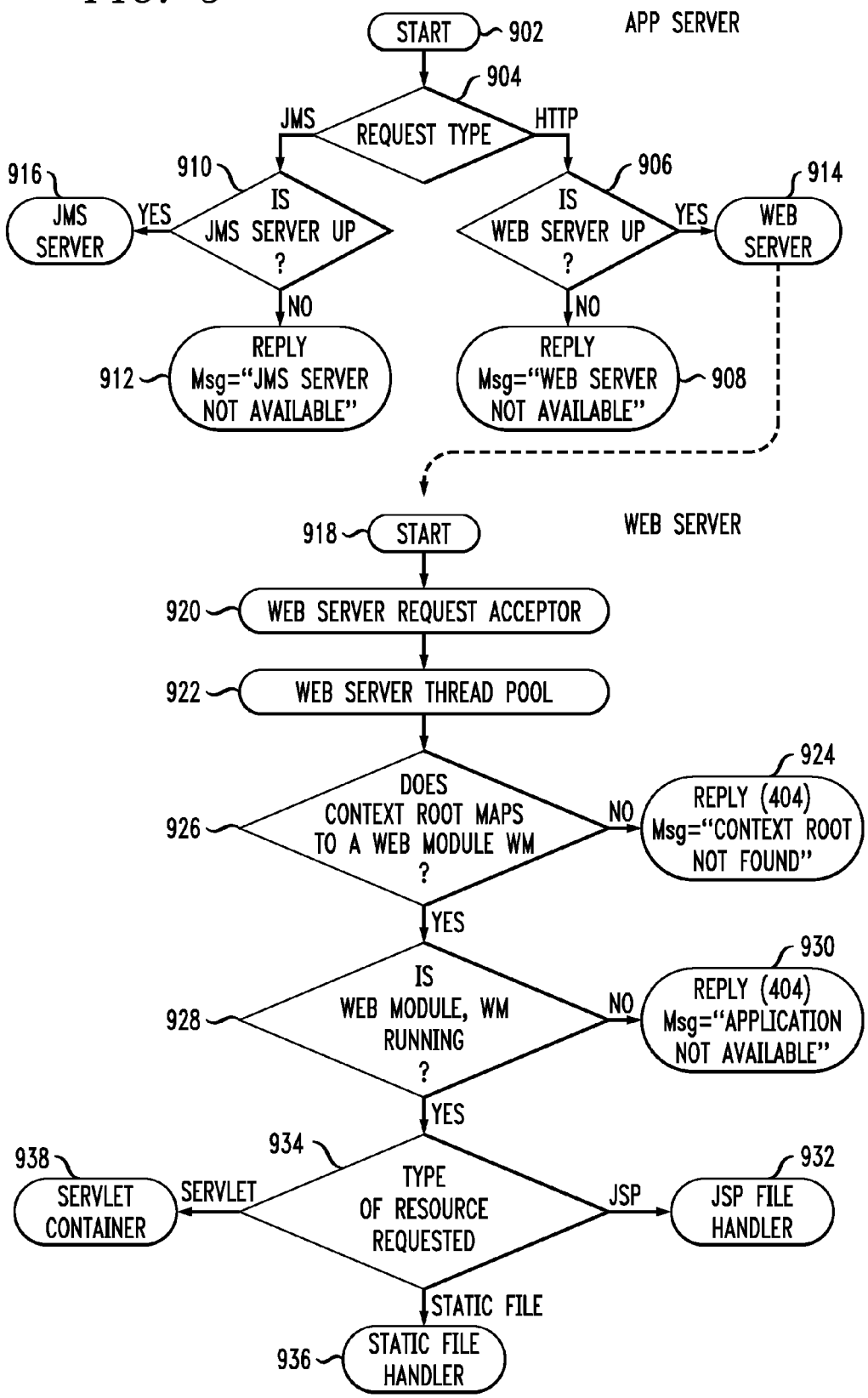
FIG. 9 is a diagram illustrating an exemplary implementation model of an app-server container, according to an embodiment of the present invention.

One can construct a behavior model to whatever granularity is desired. For example, someone else (including creator of the model in FIG. 8) may have more information about what happens when the request is processed in the web server component and that information can be added as well, as illustrated in FIG. 9. As described herein, the control and data flow information can be represented using many different models, but those models can be integrated with the rest of the system by defining an intermediate model (possibly in XML) that captures the essential information from the original model and then optionally defining rules that "stitch" (as noted above) concepts existing in the execution model with the concepts that are already part of the execution graph synthesizer.

FIG. 9 is a diagram illustrating an exemplary execution model of an app-server container, according to an embodiment of the present invention. By way of example, FIG. 9 depicts the elements and/or steps of start 902, request type 904, asking if the web server is up 906, reply message="web server not available" 908, web server 914, asking if the JMS server is up 910, reply message="JMS server not available" 912 and JMS server 916.

FIG. 9 also depicts the elements and/or steps of start 918, web server request acceptor 920, web server thread pool 922, asking if the context root maps to a web module WM 926, reply (404 message="context root not found" 924, asking if the web module (WM) is running 928, reply (404) message="application not available" 930, JSP file handler 932, type of resource requested 934, static file handler 936 and servlet container 938.

As described herein, principles of the invention include an open framework for describing meta-models of platform or application components in isolation and semantically relating the meta-models using inter-model stitching relationships. The meta-models and stitching relationships can be translated into a set of executable rules. The resulting network of meta-models, together with querying mechanisms to discover instances of the meta-models from various sources in an IT environment, can synthesize automatically and on-demand, and integrate models of an IT environment as a multilevel graph (referred to herein, for example, as an execution graph).

In one or more embodiments of the present invention, one can allow experts to define meta-models of artifacts they deal with in their specific specialty. Also, these disparate meta-models can be semantically related by writing rules. Using the network of meta-models thus constructed, one can discover instances of these meta-models by querying multiple components across systems on-demand. The net result is the ability to automatically synthesize integrated models (the execution graph) of a whole system, applications and infrastructure together.

Also, one or more embodiments of the invention include exemplary queries and analyses that can be performed on execution graphs. An example of a possible analysis is the ability to trace how a business process execution language (BPEL) process execution will involve software resources (say a thread pool) in a middleware.

One or more embodiments of the present invention include the benefits of, for example, as described below. Automatically constructed execution graphs can feed queuing analysis tools and simulators for performance analysis. Creating realistic modeling of systems (for example, queuing models) by hand is difficult and labor-intensive. Automated construction models and analyzable information base created by one or more embodiments of the invention facilitate performance analysis.

Also, execution graphs can be constructed on-demand as needed by the analysis context due to the federated query based scheme described herein. On-demand construction results in more up-to-date information for analysis compared to existing approaches that discover the dependencies among installed components and store them in a repository, because the underlying infrastructure evolves due to updates and upgrades. Moreover, the on-demand construction of just the necessary parts of an execution graph can be more scalable for large enterprise infrastructure.

Additionally, one or more embodiments of the invention are open and can be extended incrementally by experts adding meta-models from their own specialty. In contrast, existing approaches are based on a single standard. A federated meta-model approach of one or more embodiments of the present invention can live with multiple standards as well as evolution of a standard.

Principles of the present invention, as described herein, include applying meta-modeling techniques for modeling deep inside servers in an IT infrastructure. Moreover, by integrating meta-modeling with mechanisms for actually discovering instances of theses meta-models in real enterprise systems, the techniques described herein are simultaneously simple as well as powerful in dealing with enterprise-level IT complexity.

One or more embodiments of the invention can be founded upon a network of meta-models, each describing the structure and behavior of a type of system component or an application component. Moreover, for each component type, a mechanism called the adapters, used to locate and query the instances of these meta-models in a given IT environment, can be defined.

In an illustrative embodiment of the invention, one can use a unified modeling language (UML) class diagram to define structural aspects in a meta-model and a UML activity diagram for behavioral aspects. The semantics of these meta-models lies in essence in defining the semantics of relationships. One or more embodiments of the invention use an executable rule language (for example, XSB prolog) to specify the semantics of relationships. Having the executable rules allows one to semantically query the instances of these meta-models. Furthermore, the techniques described herein allow interconnecting related concepts across meta-models by a special kind of relationship referred to as a stitching relationship.

As noted above, one or more embodiments of the present invention include rule-based machinery for meta-model semantics. When a new structural meta-model in the form of UML class diagram, along with adapter, is added to the system, one or more rules and generation algorithms result. Generated rules get added to the rules repository.

For each meta-model, at least one of the following rules gets generated according to the template.

| Meta-Model Rules Template |
|---|
| model(M, '$ModelType') <br> :-model(M1, '$ModelType1'), <br> adapter('getModel', model(M, '$ModelType'), model( M1, '$ModelType1')). <br> model(M, '$ModelType') <br> :-element(E1, '$ModelElementType1',model(M1,'$ModelType1')), <br> adapter('getModel', model(M, '$ModelType'), element( El, '$ModelElementType1',model(M1, '$ModelType1')). <br> model(M, '$ModelType') <br> :- adapter('getModel', model(M, '$ModelType'), Props). |

The placeholder '$ModelType' in the template gets replaced by the name of the meta-model as the rules are added. When one of these rules is evaluated with given values to the variables used in RHS of the rule, each solution for variable M reflects one model of '$ModelType.' The value of variable M could be, for example, a prolog list of binary functors containing the key-value pairs.

The adapter clauses in essence retrieve instances of the meta-models from actual source components and create ground facts in Prolog. As described herein, adapter clauses are implemented by a variety of query mechanisms such as, for example, an XQuery for XML files and JMX calls for querying collecting statistics of system resources, etc.

For each class in a UML class diagram, the following rule can be generated:

| Class Rules Template |
|---|
| element(E, '$ElementType', model(M, '$ModelType')) <br> :- adapter('getElement', element(E, '$ElementType', model(M, '$ModelType'))). |

The placeholder '$Element Type' gets replaced by the name of the class. When this rule is evaluated with a given value of variable M, each solution for variable E reflects an instance of class '$ElementType' in model M of '$ModelType.' The value of variable E would be a prolog list of binary functors named 'attribute,' where each unique functor contains the name of one attribute defined in the class '$ElementType' and its value (for example, if there is an instance of class C containing attributes a1, and a2 with values v1, and v2, one solution to E would be [attribute(a1, v1), attribute(a2, v2)]).

For each association relationship in the UML class diagram, the following rules can be generated:

| Relationship Rule Template |
|---|
| relation('$RelationType', <br> element(E1, '$ElementType1', model(M, '$ModelType')), <br> element(E2, '$ElementType2', model(M, '$ModelType'))) <br> :- $Constraint |

The placeholder '$Relation Type' gets replaced by the name of the relation, $ElementType1 and $ElementType2 get replaced by the name of the source and destination UML classes, respectively. Also, $ModelType gets replaced by the name with which the meta-model is added to the system. $Constraint gets replaced by the constraint expressed by rules mostly, but not limited to, in terms of E1, E2, and M. The constraint cannot be automatically generated by plain class diagram. It has to be augmented with constraint expressed in the rule language. In an illustrative embodiment of the invention, constraint can be assumed to be specified in prolog syntaxes. When this rule is evaluated with given values of any combination of variables E1, E2, and M, each solution to the unbounded variables, along with already bounded variables, reflects a relation between instances E1, and E2 of type $ElementType1, and $ElementType2, respectively, in model M of type $ModelType.

In the case of UML composition relationship and certain cases of association relationship, the evaluation of constraints may need to consider the conditions that are external to the meta-model. In other words, those properties are not captured in meta-model. In these cases, the responsibility can be delegated to figure out the relationship between model elements to the adapter of the meta-model by following rule:

| Relationship Validation Template |
|---|
| relation('$RelationType', <br> element(E1, '$ElementType1', model(M, '$ModelType')), <br> element(E2, '$ElementType2', model(M, '$ModelType'))) <br> :- adapter('getRelation', '$RelationType' <br> element(E1, 'ElementType1', model(M, '$ModelType')), <br> element(E2, 'ElementType2', model(M, '$ModelType'))). |

Inheritance relation can be treated as a special case and can be handled at meta-level only because all of the instances are going to follow it. From instances, it is possible to check their type and get access to the attributes in the tree of inheritance hierarchy. One expedient way of defining meta-models within one or more embodiments of the invention is to start with XML schemas because most of the meta-models of application components in SOA environment are defined through specifications augmented by XML schemas and file system packaging instructions. Standard mechanisms can be used to represent XML schemas into UML class diagrams and generate corresponding Xqueries-based adapters to instantiate the model elements and relationships among them. These UML class diagrams can be further enhanced, for example, by adding more associations and semantic constraints.

Figure 10:
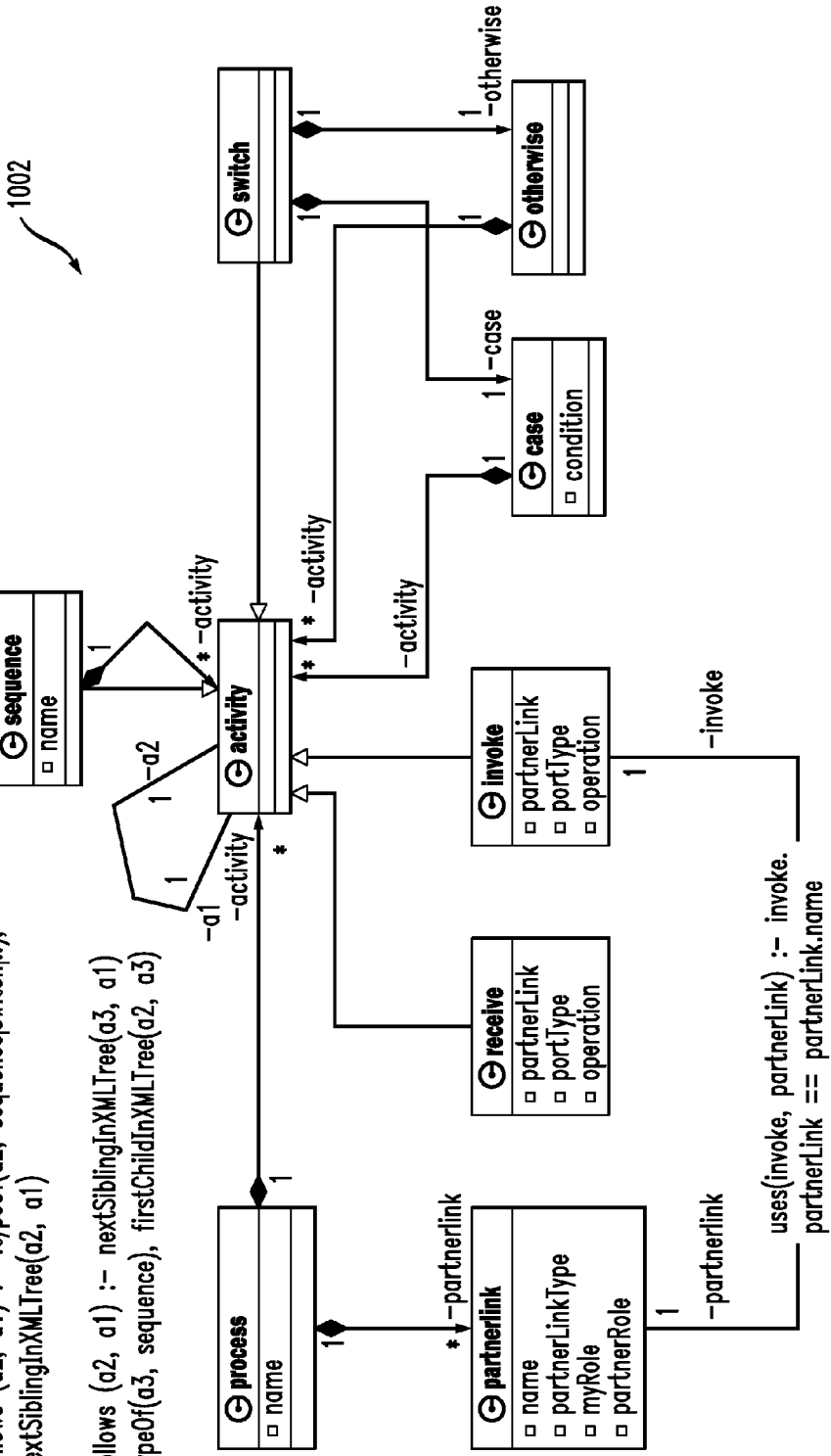
FIG. 10 is a diagram illustrating a BPEL4WS meta-model, according to an embodiment of the present invention.

FIG. 10 is a diagram illustrating a BPEL4WS meta-model 1002, according to an embodiment of the present invention. FIG. 10 is an example with a partial BPEL4WS meta-model derived from an XML schema for BPEL4WS documents and corresponding generated rules. Consider the association 'uses' between the element 'invoke' and the element 'partnerLink.' The element 'invoke' uses the element 'partnerlink' if both are defined in the same BPEL document and the value of the 'partnerLink' attribute of 'invoke' matches the value of the 'name' attribute of 'partnerLink.' This association is added in a formal way to the diagram. Following are a few exemplary rules that can be generated when BPEL4WS meta-model is added to the system.

| BPEL4WS MetaModel Rules |
|---|
| model(M, 'BPEL') <br> :- model(M1, 'SCAComponent'), <br> adapter('getModel', model(M, 'BPEL'), model(M1, 'SCAComponent')). <br> element(E, 'partnerlink', model(M, 'BPEL')) <br> :- adapter('getElement',element(E, 'partnerlink', model(M, 'BPEL'))). |

| BPEL4WS MetaModel Rules |
| --- |
| element(E, ,'invoke', model(M, 'BPEL'))<br>:- adapter('getElement', element(E, 'partnerlink', model(M, 'invoke'))).<br>relation('uses',<br>element(E1, 'invoke', model(M, 'BPEL')),<br>element(E2, 'partnerlink', model(M, 'BPEL')))<br>:- member(attribute('partnerLink', X), E1),<br>member(attribute('name', Y), E2),<br>X=Y. |

The structure of middleware components can be described in a UML class diagram, and the rules can be generated using similar techniques as used for meta-models of application components. For capturing the behavioral details of middleware components, one can use a UML activity diagram with following additions. Each data type associated with data pins should be one of the types defined in one of the structural meta-models. Also, if an action invokes the operation, it should be on one of the instances of a type defined in the structural meta-model. Additionally, several annotations can be used on different kind of elements in a UML activity meta-model for capturing properties that are of interest in a QoS analysis such as, for example, {upper Bound} for pins to indicate the buffer size of the pin, {reentrant} for action to indicate the parallel processing of action on data in a buffer at input pins, {resource} for a central buffer to differentiate the middleware resources from the data, etc.

Figure 11:
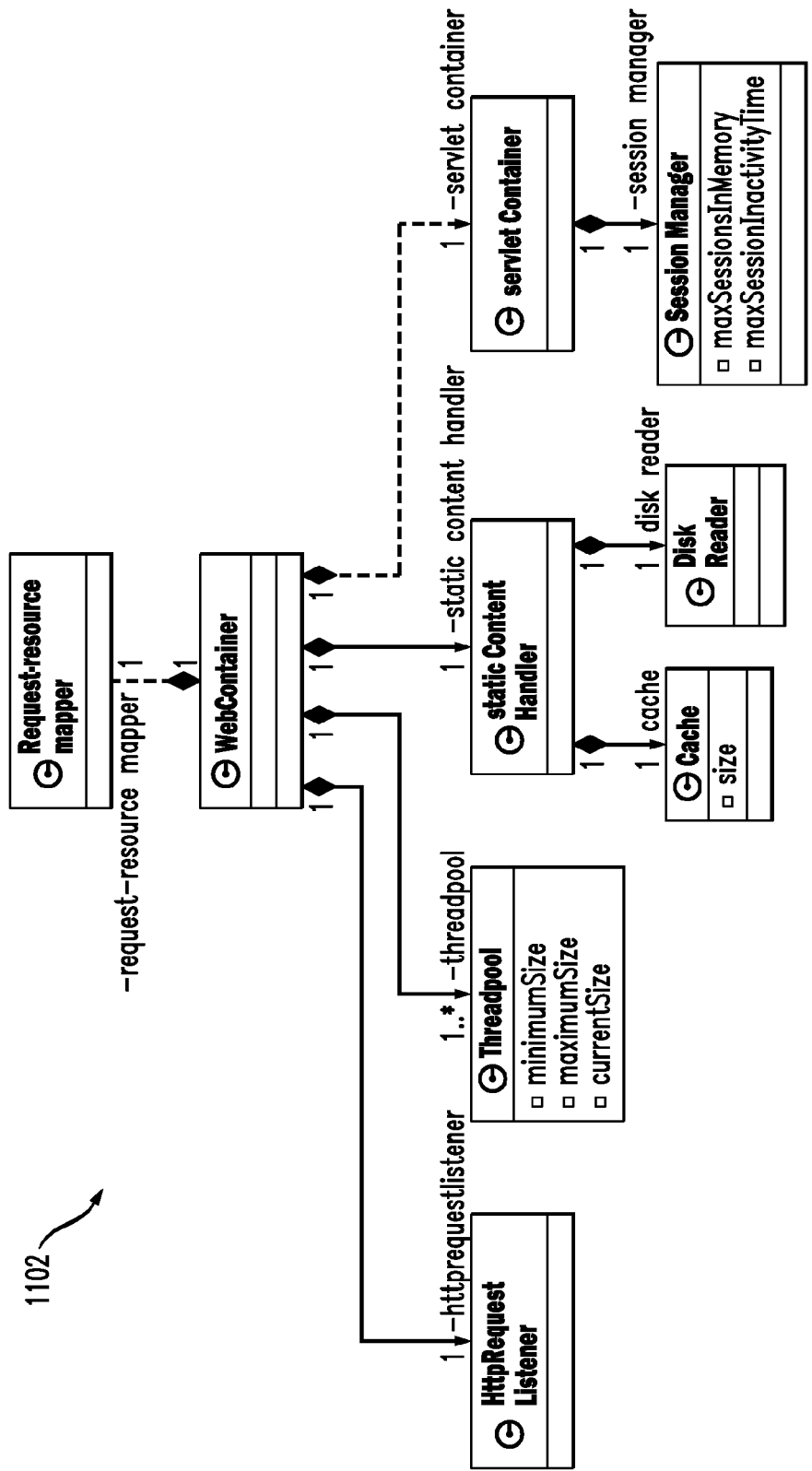
FIG. 11 is a diagram illustrating a web container structural meta-model, according to an embodiment of the present invention.
Figure 12:
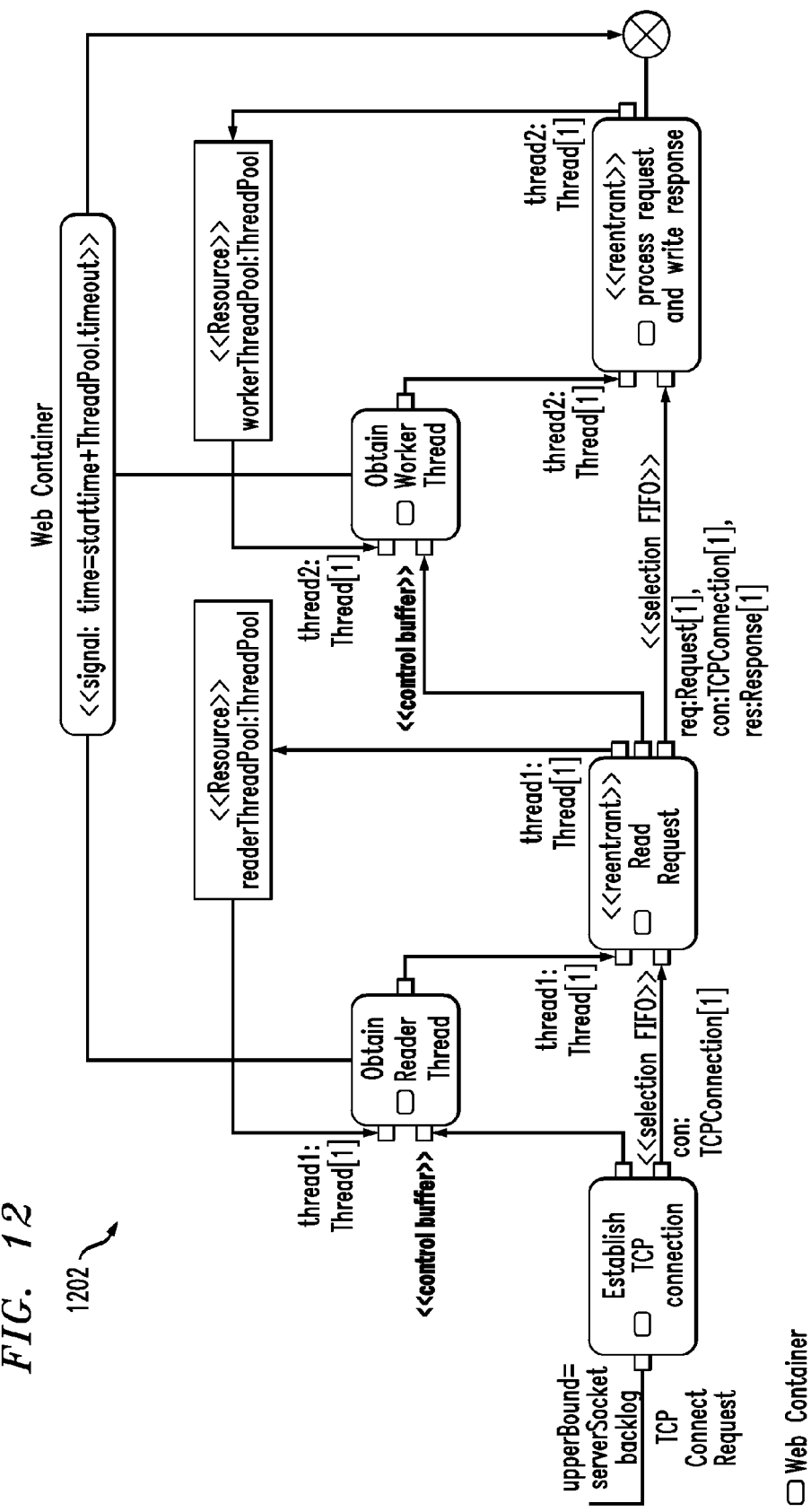
FIG. 12 is a diagram illustrating a unified modeling language (UML) activity model of a web container, according to an embodiment of the present invention.

FIG. 11 is a diagram illustrating a web container structural meta-model 1102, according to an embodiment of the present invention. FIG. 12 is a diagram illustrating an UML activity model 1202 of a web container, according to an embodiment of the present invention. FIG. 11 and FIG. 12 are exemplary UML meta-models for a typical J2EE-based web container and UML activity model for its behavioral aspects. The activity diagram in FIG. 12 captures the behavioral details of a web container. This captures the basic 'actions' that happen inside a web container along with control and data flow that takes place among them.

The following are exemplary semantics that can be, for example, extracted out of the above activity diagram. The 'Establish TCP connection' action is activated when a 'TCP connect request' arrives at an input data pin of the action. The buffer size of an input data pin is specified by 'serverSocket-.backlog' configuration (that is, if a 'TCP connect request' arrives while the buffer is full, it will be rejected). The action 'Establish TCP connection' works on 'TCP connect request' one by one and produces two outputs, one control output and one data output. The control output activates the 'Obtain Reader Thread' action and data output (that is, 'con:TCPConnection' flows to 'Read Request' action that also requires one 'Thread' in order to get activated). Many instances of the 'Read Request' action can execute concurrently to work on a buffer of 'TCPConnections' on its input pin because it is marked as <<reentrant>>. '<<signal . . . >>' shows that if 'Obtain Reader Thread' does not finish after the 'ThreadPool-.timeout' period of its start, it will finish the flow. The rest of the actions and control and data flow edges can be explained in a similar manner.

Each of the actions can be further explained in more granularities either with in-same behavioral model or in-separate suitable models. For example, 'Establish TCP Connection' and 'Obtain Reader Thread' actions can have detailed state machine-based models to explain the further internal details of the actions while the 'process request and write response' action can be better elaborated in an activity-based model to highlight the details of how a web resource requested is located and/or instantiated and executed, as well as the role of cache and session management in the process, etc.

Figure 13:
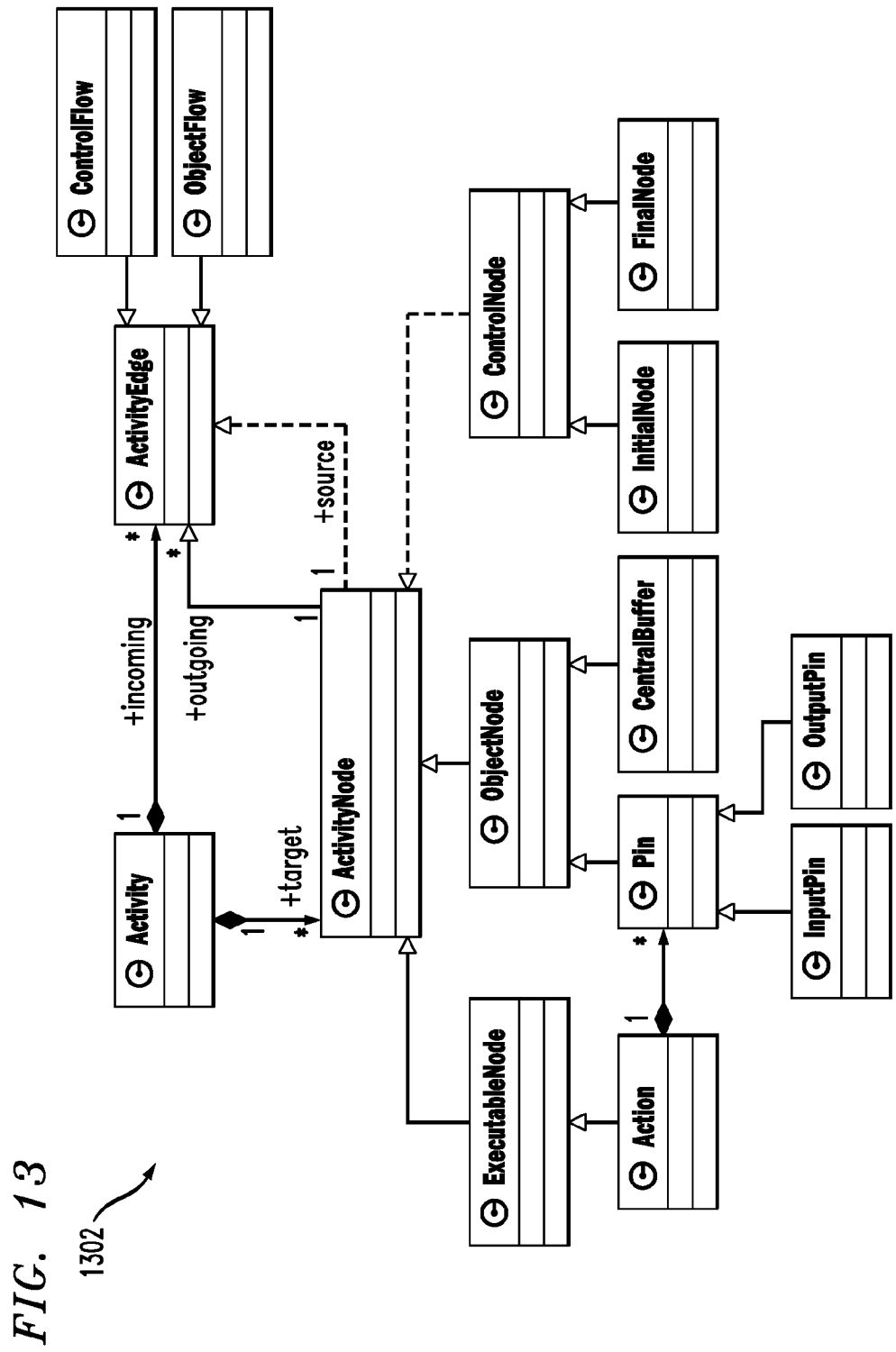
FIG. 13 is a diagram illustrating a meta-model of an UML activity diagram, according to an embodiment of the present invention.

Similarly, behavior of other infrastructure components can be described using UML activity models. The semantics of UML activity meta-model can be captured, as shown partially in FIG. 13 using the same technique as described for the meta-models of application components. FIG. 13 is a diagram illustrating a meta-model 1302 of an UML activity diagram, according to an embodiment of the present invention.

The generated rules can be universally applied to any activity diagram describing a middleware component. As described herein, only a few exemplary rules are discussed to demonstrate the semantics of behavior models of middleware containers, primarily those rules necessary to know the sequencing of resources consumed in processing of any activity model.

| UML activity meta-model rules |
| --- |
| relation('follows',<br>element(E1, 'Action', model(M, 'UMLActivity')),<br>element(E2, 'Action', model(M, 'UMLActivity')))<br>:- relation('incomingEdge',<br>    element(E3, 'ControlFlow', model(M, 'UMLActivity')),<br>    element(E1, 'Action', model(M, 'UMLActivity'))),<br>  relation('outgoingEdge',<br>    element(E3, 'ControlFlow', model(M, 'UMLActivity')),<br>    element(E2, 'Action', model(M, 'UMLActivity'))).<br>relation('incomingEdge',<br>  element(E1, 'ControlFlow', model(M, 'UMLActivity')),<br>  element(E2, 'Action', model(M, 'UMLActivity')))<br>:- adapter("incomingEdge',<br>    element(E1, 'ControlFlow', model(M, 'UMLActivity')),<br>    element(E1, 'Action', model(M, 'UMLActivity')))).<br>relation('obtains',<br>  element(E1, 'Action', model(M, 'UMLActivity')),<br>  element(E2, 'CentralBuffer', model(M, 'UMLActivity')))<br>:- relation('belongsTo',<br>    element(E3, 'InputPin', model(M, 'UMLActivity')),<br>    element(E1, 'Action', model(M, 'UMLActivity'))),<br>  relation('dataflow',<br>    element(E2, 'CentralBuffer', model(M, 'UMLActivity')),<br>    element(E3, 'InputPin', model(M, 'UMLActivity'))), |

As described herein, a model adapter is a component in one or more embodiments of the invention that is responsible for creating instances of meta-models (that is, models, model elements, and basic relationships describing meta-model semantics). There are a variety of ways in the techniques described herein to locate and discover instances of models of different meta-models, and to extract the model elements represented by adapter rules starting with, for example, 'model', and 'element' predicates, respectively. For example, in order to locate an instance of 'J2EE application' meta-model, an adapter needs to know how to get the ear files on a J2EE application server, and given an ear file, how to extract instances of elements in the model following the packaging standards and XML schemas of descriptors of J2EE application.

In an illustrative embodiment of the invention, the adapter would accept the element 'ApplicationServer' in a model of type 'J2EE Application Server' meta-model and would be able to locate the models of type 'J2EE Application' corresponding to each application deployed on the server. Further, for each application model, the adapter would extract the instances of elements of 'module' by firing proper XQuery on application.xml found in a META-INF folder under the root folder of ear file. One of the adapter rules accepts the properties' object in place of any other model or model element. Such a provision can, for example, be used for bootstrapping the system to enable it find the models of at least one meta-model without depending on other models or model elements. In an illustrative embodiment of the invention, there can be such a bootstrapping adapter that accepts a list of IP addresses and locates the 'J2EE application server' models. Such a provision also enables the integration of external repositories into the framework (for example, a change and configuration management database (CCMDB)).

In one or more embodiments of the present invention, each of the meta-models can be combined to create a network of semantically integrated meta-models of a system. Stitching between meta-models can be defined as the process of capturing the relationship among different meta-models. The relationship can exist between elements of a meta-model and another meta-model, or between two elements from two separate meta-models. For example, whenever a new stitch with relationship name $RelationType is added into our framework one of the rules get generated as per the template described below.

| Stitching Relationship Rule Template |
| --- |
| relation('$RelationType', <br> element(E1, '$ElementType1', model(M1, '$ModelType1')), <br> model(M2, '$ModelType2')) <br> :- $Constraints <br> relation('$RelationType', <br> element(E1, '$ElementType1', model(M1, '$ModelType1')), <br> element(E2, '$ElementType2', model(M2, '$ModelType2'))) <br> :- $Constraints |

Figure 14:
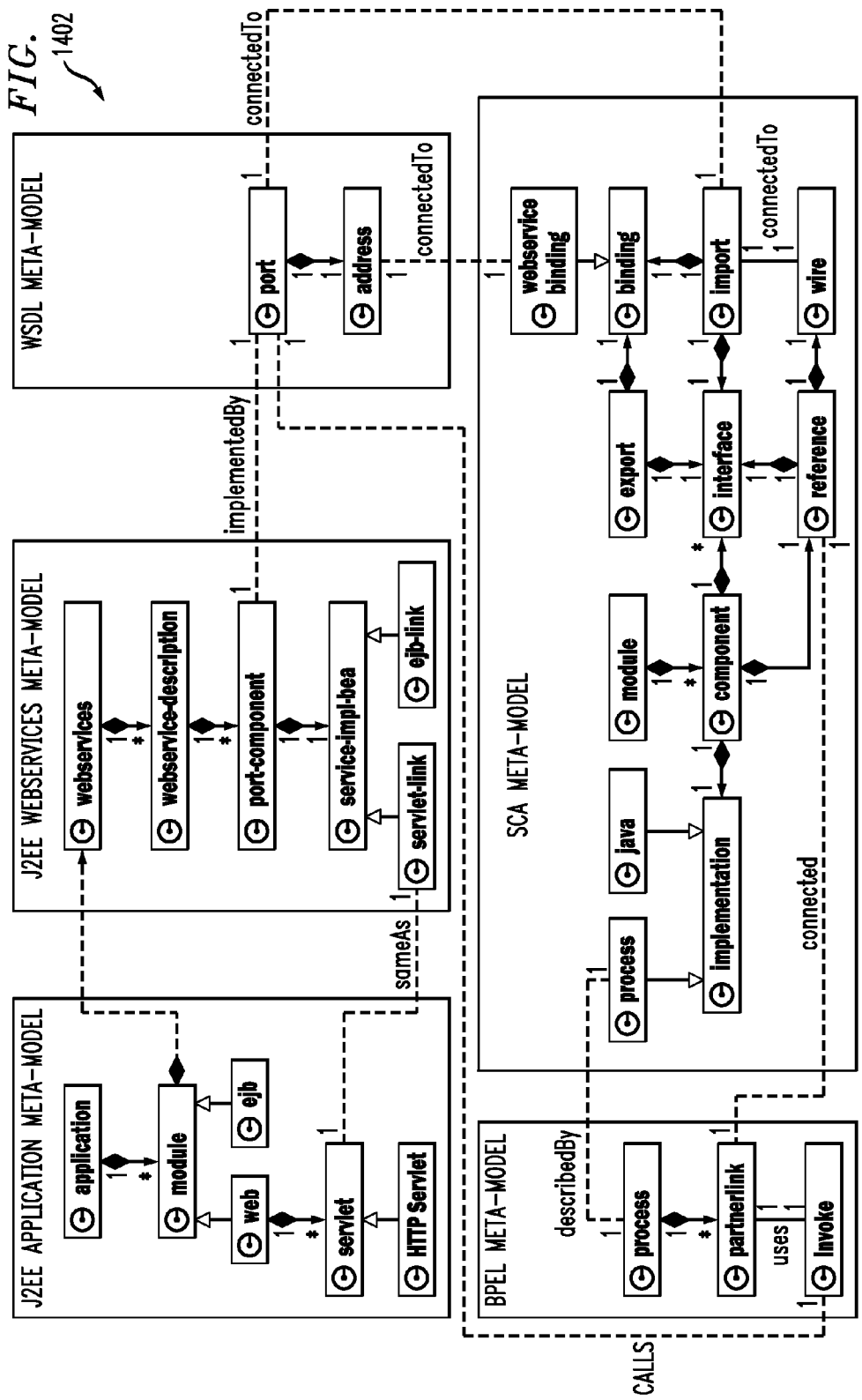
FIG. 14 is a diagram illustrating stitching among meta-models of application components, according to an embodiment of the present invention.

FIG. 14 is a diagram illustrating stitching among meta-models of application components 1402, according to an embodiment of the present invention. FIG. 14 illustrates how integrated models of components of a composite SOA application can be constructed out of isolated models of its components by utilizing the meta-models and stitching relationships.

Consider a composite SOA application where a BPEL process includes services from several web services, and the web services are implemented by J2EE components. Multiple layers of artifacts are involved. For example, process and web service components can be packaged as service component architecture (SCA) models where inter-component linkages are expressed as "wires." An SCA component encapsulating a BPEL process refers to SCA components encapsulating web services as "import" references. Inside BPEL components, the activities that invoke the services can be referred to as "partner links." The concept "partner link" in BPEL models should advantageously be semantically linked with "references" in SCA models. As shown in FIG. 14, this semantic relationship is expressed as a stitching relationship "connected."

FIG. 14 depicts a few examples of such stitching relationships among different application component meta-models, namely a J2EE application meta-model necessary to describe web service implementations, J2EE web service meta-model [19] for exposing J2EE components in Web Service, a WSDL meta-model for interfaces, a BPEL4WS meta-model for the BPEL process models and a SCA meta-model for composing components. As described herein, the stitching relationships between different meta-model elements are depicted in FIG. 14. For example, the stitching relationship 'sameAs' between 'servlet-link' element of J2EE web-services meta-model and 'servlet' element of J2EE application meta-model denotes that these two elements describe the same concept (that is, servlet). Each stitching relationship can be captured using rules in the manner described above.

An exemplary stitching rule for 'calls' relationship between 'invoke' element of BPEL meta-model and 'port' element of WSDL meta-model is also depicted in FIG. 14. The rule is defined in terms of other rules, including BPEL meta-model semantics rule as a 'uses' relationship between 'invoke' and 'partner link' elements, and other stitching rules such as a 'connectedTo' relationship between the 'partner-link' element of BPEL meta-model and the 'reference' element of a SCA meta-model.

| Rule for 'calls' relationship |
| --- |
| relation('calls', <br> element(E1, 'invoke', model(M1, 'BPEL')), <br> element(E2, 'port', model(M2, 'WSDL'))) <br> :- relation('uses', <br> element(E1, 'invoke', model(M1, 'BPEL')), <br> element(E3, 'partnerlink', model(M1, 'BPEL'))), <br> relation('connectedTo', <br> element(E3, 'partnerlink', model(M1, 'BPEL')), <br> element(E4, 'reference', model(M3, 'SCAModule'))), <br> relation('connectedTo', <br> element(E4, 'reference', model(M3, 'SCAModule')), <br> element(E5, 'import', model(M3, 'SCAModule'))), <br> relation('connectedTo', <br> element(E5, 'import', model(M3, 'SCAModule')), <br> element(E2, 'port', model(M2, 'WSDL'))). |

Activity models of different infrastructure components can be related, as one activity of one component's activity model can be described in detail by another component's activity model. This provides an opportunity to describe activity models of different components independently, and subsequently link them. For example, in the activity model of application server, an activity corresponds to the request handling by a web-container, which is described in detail by the activity model of the web-container. This type of relationship is already captured as a 'call behavior' relationship between the action element and activity element in the meta-model of UML activity.

The relations between infrastructure structural meta-model elements and management meta-model elements can be captured using the same technique as described earlier for meta-model stitching. An example of this can be a 'sameAs' relationship between element 'ThreadPool' in a structural meta-model of 'Web Container' and a management meta-model of 'Web Container.'

The execution of application components can be carried out by middleware containers. Such a relationship of application components to the middleware containers can be captured, for example, as stitching rule 'deployedOn' in the form as follows.

| DeployedOn Relationship |
| --- |
| relation('deployeOn' <br> element(A,'servlet',model(M1,'J2EE Application'), <br> element(W,'WebContainer',model(M2,'J2EE Application Server')) <br> :- relation('DeployedOn', <br> element(App,'Application',model(M1,'J2EE Application'), <br> element(S,'ApplicationServer',model(M2, 'J2EE Application Server')), <br> relation('belongsTo', <br> element(A,'Servlet',model(M1,'J2EE Application'), <br> element(App,'Application',model(M1, 'J2EE Application')), <br> relation('belongsTo', |

| DeployedOn Relationship |
| --- |
| element(W,'WebContainer',model(M2, 'J2EE Application Server'), <br> element(S,'Server',model(M2, 'J2EE Application Server')). |

Additionally, the infrastructure management meta-model describes management aspects such as, for example, performance monitoring of application components (for example, average time spent in execution of a servlet). This relation can be described, for example, as stitching relation 'sameAs' between an element of application meta-model and a corresponding element of management meta-model (for example, the 'sameAs' relationship between 'servlet' elements in both meta-models for the servlet example).

An integrated model can be a multi-layered graph where model elements are treated as nodes and the relations between them is captured as edges among them. By following a path, one can trace how a new composite application will execute on a given platform, all the way down to resources in the underlying infrastructure. In order to query the integrated model, two types of queries can be supported on this data model. Meta-model queries are for finding the all-node types, and possible relationship types between them. Integrated model queries are for finding the actual instances of the discovered node types and the relation types among them. This also includes queries that are based on the semantics added to the rules repository, using the basic rules for getting nodes and relating them.

A complete graph need not, for example, be stored in a repository, but can be incrementally created by resolving the queries and using appropriate adapters to fetch the desired data at run-time. Additionally, caching can be used for performance, and a federated methodology makes the techniques described herein scalable.

Figure 15:
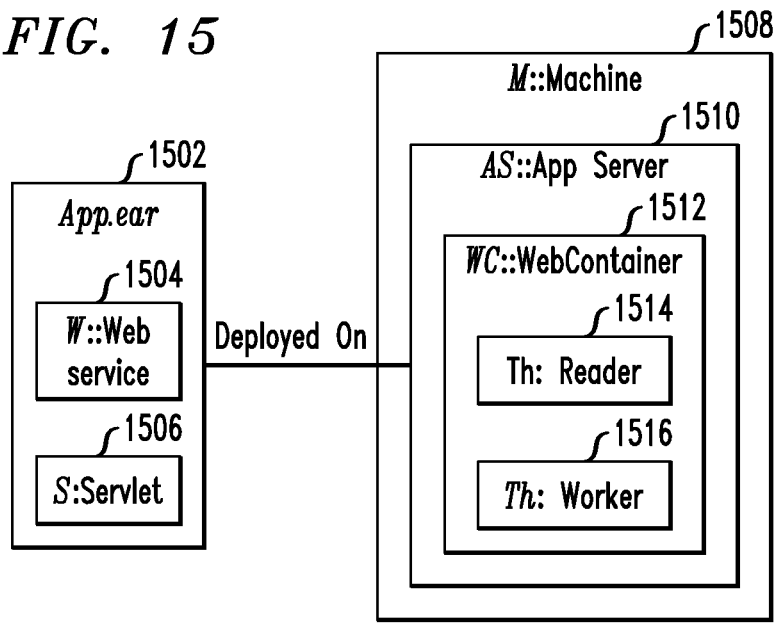
FIG. 15 is a diagram illustrating an exemplary IT environment, according to an embodiment of the present invention.

FIG. 15 is a diagram illustrating an exemplary IT environment, according to an embodiment of the present invention. Consider an IT system that includes an application server AS 1510 deployed on a machine M 1508, and an application App.ear 1502 including web-service W 1504 and servlet S 1506 deployed on AS 1510, as depicted in FIG. 15 herein. Consider a simple query of finding all the web-services in this IT system. This query can be resolved into sub-queries recursively by a prolog engine based on meta-model rules. This can, for example, trigger the execution of several tasks.

For example, instances of a 'J2EE application server' meta-model can be discovered via execution of a corresponding adapter. For each of these discovered models, an 'ApplicationServer' element is extracted and another adapter corresponding to the 'J2EE Application' meta-model is invoked by passing an 'ApplicationServer' element. Instances of 'J2EE Application' meta-model can also be discovered.

For each of the discovered 'J2EE Application' models, 'module' elements are extracted and using each of these, a 'J2EE Web Service' meta-model can be discovered by a corresponding adapter. Also, 'webservice' elements of each 'J2EE Web Service' model can give the desired answers for the mentioned query. In the exemplary FIG. 15, the result includes only one web service, W 1504.

Explaining a particular step in the above mentioned process in more detail could include, for example, firing the XQuery and/or application and/or module on application.xml by an adapter corresponding to the 'J2EE Application' meta-model for instantiating the 'module' element for a discovered model instance of a 'J2EE Application' meta-model.

As depicted in FIG. 15, consider a complex query of finding the resources used while processing a request for web-service W 1504. This query can be decomposed to several sub-queries including finding the application component call path, the 'hostedOn' relation between a component and container, and queries for finding the resources of the container, which in turn uses the structure model and the activity model of containers. In this example, because web service W 1504 is implemented by servlet S 1506, the component level call path includes servlet S 1506. Web service W 1504 and servlet S 1506 both are deployed on web-container WC 1512, as App.Ear 1502 is deployed on AppServer AS 1510, which contains Web Container WC 1512. Using the activity diagram of Web Container 1512, while handling the request, first a thread from Th1:Reader 1514 thread pool is obtained, the request is read, the thread is released, and a thread from Th2:Worker 1516 thread pool is obtained, the request is processed and the thread is released. So the ordered list of resources consumed inside WC 1512 are Th1:Reader 1514 and Th2:Worker 1516.

One or more embodiments of the invention include a meta-model driven approach that is part of the model-driven architecture (MDA) movement. The techniques described herein extend the model-driven concepts from development tools to the arena of model-driven systems management. It is in the systems where enterprise IT complexity lies.

Figure 16:
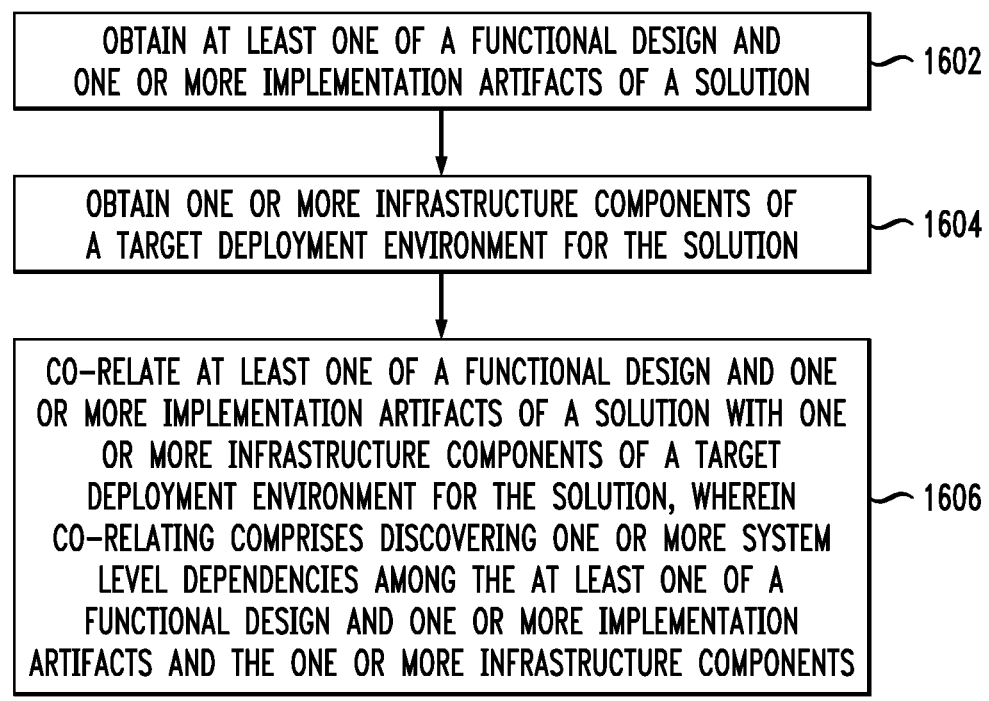
FIG. 16 is a flow diagram illustrating techniques for co-relating at least one of a functional design and at least one implementation artifact of a solution with at least one infrastructure component of a target deployment environment for the solution, according to an embodiment of the present invention.

FIG. 16 is a flow diagram illustrating techniques for co-relating at least one of a functional design and at least one implementation artifact of a solution with at least one infrastructure component of a target deployment environment for the solution, according to an embodiment of the present invention. Step 1602 includes obtaining at a functional design and/or implementation artifacts of a solution. Step 1604 includes obtaining infrastructure components of a target deployment environment for the solution. Step 1606 includes co-relating a functional design and/or implementation artifacts of a solution with infrastructure components of a target deployment environment for the solution, wherein co-relating includes discovering system level dependencies among a functional design and/or implementation artifacts and the infrastructure components.

The techniques depicted in FIG. 16 can also include answering a query of run-time implications of a design in terms of potential resources consumed by operations of a designed artifact. Additionally, the techniques depicted in FIG. 16 can include answering a query of enterprise implications of infrastructure observations and/or issues including an exception, a monitored event and/or a failure.

The techniques depicted in FIG. 16 can also, as described herein, be run on a system, wherein the system includes distinct software modules, each of the distinct software modules being embodied on a tangible computer-readable recordable storage medium.

Also, one or more embodiments of the invention include a system for co-relating at least one of a functional design and at least one implementation artifact of a solution with at least one infrastructure component of a target deployment environment for the solution. Such a system can include, for example, a synthesizer that integrates input models, source connectors that import respective models from a source and wherein the source is a design tool, a file system and/or an infrastructure component. Such a system can also include meta-models, wherein each meta-model captures semantics of a corresponding model in terms of entity type, relationship type and/or behavior of a given kind of model, as well as stitching relationships among elements of the meta-models that describe relationships among a set of meta-model elements from multiple meta-models that are semantically related.

Query mechanisms for source connectors can further be of several ways inclusive of, for example, Xquery/Xpath for models expressed as XML files, and JMX, if it is supported in the infrastructure. The synthesizer (for example, an execution graph synthesizer) can, for example, process submitted queries by using information from multiple meta-models by traversing stitching relationships to decompose submitted queries into sub-queries on appropriate models. A synthesizer can also, for example, direct the sub-queries to at least one respective model via the source connectors to retrieve information from actual sources.

New meta-models can be added to the system and related to the meta-models by adding at least one appropriate stitching relationship, thereby making the system extensible. Also, the input models can include, for example, functional design and implementation artifacts, placement directives for deploying the functional artifacts on a target infrastructure, and/or a model of properties and contents of components of the target infrastructure. Each model can include specific entities and relationships describing structure and/or behavior of functional design artifacts, a target infrastructure component, and/or placement directives.

The meta-models can include, for example, meta-models of structure and/or behavior of typical development artifacts in an SOA system, meta-models of structure and behavior of infrastructure components, and/or meta-models of structure and behavior of management facilities (including, for example, JMX, simple network management protocol (SNMP), etc.) for infrastructure components and functional components, wherein each meta-model describes structure and/or behavior of models admitted by the meta-model. Structural meta-models can be further expressed by representations such as, for example, UML class diagrams, UML composite structure diagrams, and/or XML schemas.

The meta-models of structure and behavior of typical development artifacts in an SOA system can include, for example, definitions of a BPEL process, web services and/or implementation artifacts of the web services (such as, for example, enterprise JavaBeans (EJBs), servlets, etc.). The meta-models of structure and behavior of infrastructure components can include, for example, a process server, a web container and/or a managed object container in an application server (which are typical of contemporary J2EE or .Net middleware environment) and resource sub-components of these infrastructure components. Behavioral meta-models can further include UML behavioral models such as activity diagrams, sequence diagrams and collaboration diagrams, and layered queuing networks.

Semantics of the stitching relationships and semantics of relationships used in the meta-models can be, for example, expressed in an executable rules language (including, for example, Prolog and/or agent building and learning environment (ABLE) and interpreted by suitable forward and backward-chaining traversal algorithms implemented in a conventional programming language (including, for example, Java or C++ or C). Furthermore, implications of multiple relationships can also be expresses as higher level rules. A synthesizer, as detailed above, can include, for example, a rules execution engine to interpret and reason with rules to implement query decomposition processing. Additionally, the meta-models and stitching relationships can be translated into rules in an executable rules language (that can be, for example, inferences with and/or by a rules execution engine).

FIG. 17 is a diagram illustrating techniques 1702 for computing inter-component co-relations, according to an embodiment of the present invention. As depicted in FIG. 17, one or more embodiments of the invention include finding a model M1 such that element type ET1 is in model M1, and a model M2 such that element type E2 is in model M2. Also, the techniques described herein can also include finding a model level path P from element type ET1 in model M1 to element type ET2 in model M2 by traversing relationships in model M1 starting from ET1, through inter-model stitching relationships from model M1 through zero or more intermediate models Mj to model M2, and through the relationships in model M2 ending with element type ET2.

As detailed herein, for example, path P can be an ordered list of relationship definitions of the form Rk(ETi, ETi+1), where the relationship Rk is between // element type ETi and element type ETi+1 in some model traversed during the construction of model level path P. Additionally, for every element type ETi in the model level path P, one or more embodiments of the invention can locate an element Ei of element type ETi in a source component Si such that ETi is in a model Mi, and wherein source Si is an instance of model Mi. Also, the source adapter for a model is capable of locating a source component instance of a model by searching an IT environment.

Further, as depicted in FIG. 17, one or more embodiments of the invention can include instantiating model level path P to get instantiated path P' by substituting E1 for ET1 and E2 for ET2 in the relationships in path P, and for all other intermediate element types ETi in the relationships in P, by substituting each element type ETi by a corresponding instance element Ei (as described herein). The techniques detailed herein also include checking the validity of the instantiated path P' such that the constraints of every relationship r(Ei,Ej) in path P' are satisfied by the properties of the elements Ei and Ej.

If the instantiated path P' is not valid, then one can find another model level path P and repeat the process. Also, one or more embodiments of the invention include returning instantiated path P' as result.

Figure 18:
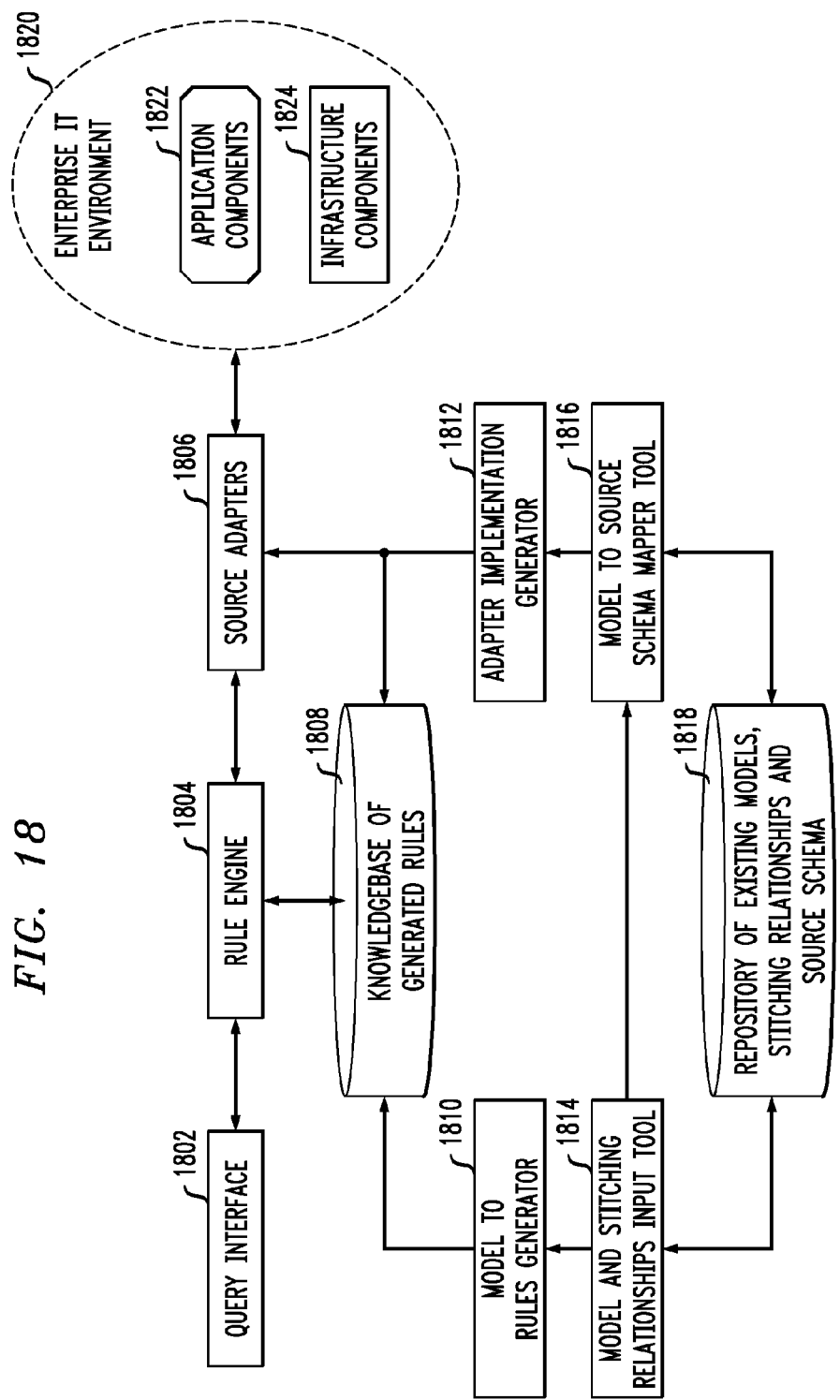
FIG. 18 is a schematic block diagram, according to an embodiment of the present invention.

FIG. 18 is a schematic block diagram, according to an embodiment of the present invention. By way of illustration, FIG. 18 depicts a rule engine 1804 interacts with a query interface 1802, a source adapter 1806, as well as a knowledge-base of generated rules 1808. The source adapter 1806 interacts with an enterprise IT environment 1820, which can include application components 1822 and infrastructure components 1824.

FIG. 18 also depicts a repository 1818 of existing models, stitching relationships and source schema, which interacts with a model and stitching relationships input tool 1814, as well as with a model to source schema mapper tool 1816. The input tool 1814 provides input to a model to rules generator 1810, which provides input to the knowledge-base of generated rules 1808. Additionally, the mapper tool 1816 provides input to an adapter implementation generator 1812, which also provides input to the knowledge-base of generated rules 1808.

Figure 19:
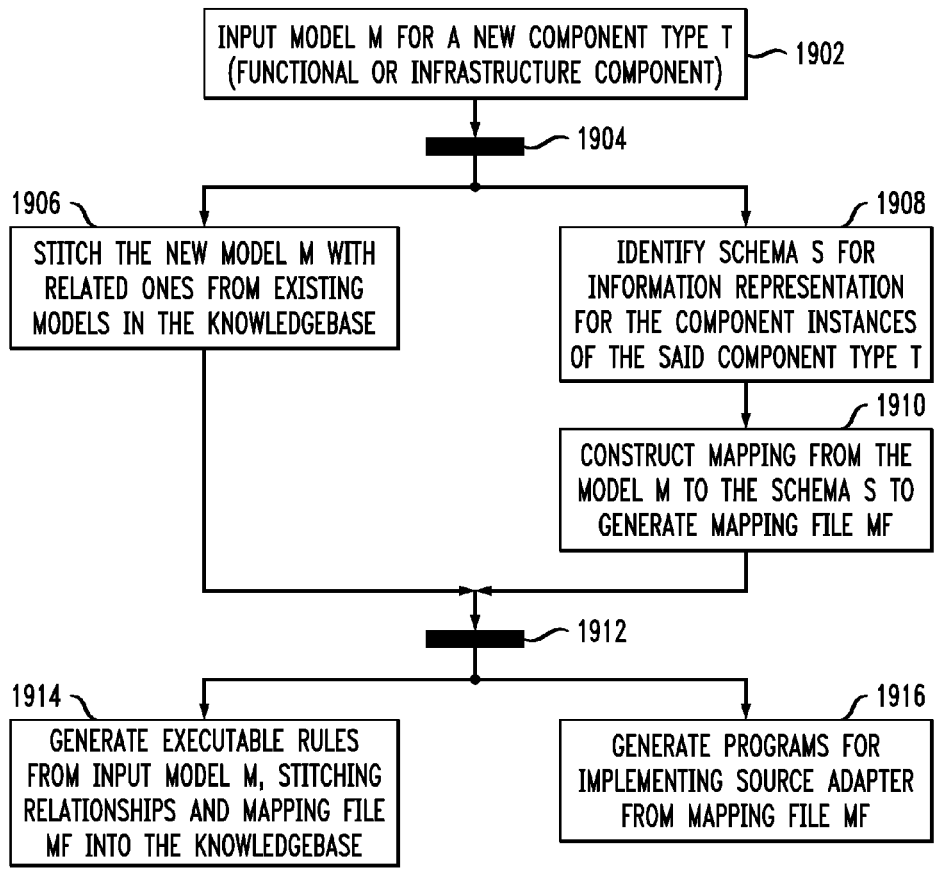
FIG. 19 is a flow diagram illustrating techniques for adding a new component type to a knowledgebase, according to an embodiment of the present invention.

FIG. 19 is a flow diagram illustrating techniques for adding a new component type to a knowledgebase, according to an embodiment of the present invention. Step 1902 includes inputting model M for a new component type T (for example, a functional of infrastructure component). Step 1904 includes deciding whether to proceed to step 1906 or 1908 (both described herein). Step 1906 includes stitching the new model M with related models from existing models in the knowledge-base. Step 1908 includes identifying a schema S for information representation for the component instances of the component type T. Also, step 1910 includes constructing mapping from model M to the schema S to generate a mapping file MF.

Step 1912 includes deciding whether to proceed to step 1914 or 1916 (both described herein). Additionally, step 1914 includes generating executable rules from input model M, stitching relationships and mapping file MF into the knowledge-base. Step 1916 includes generating programs for implementing a source adapter from mapping file MF.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 20:
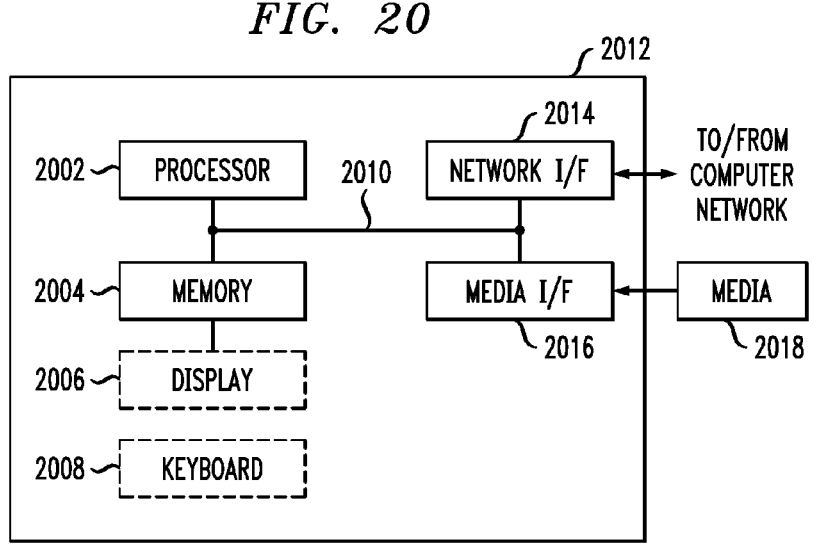
FIG. 20 is a system diagram of an exemplary computer system on which at least one embodiment of the present invention can be implemented.

At present, it is believed that the preferred implementation will make substantial use of software running on a general-purpose computer or workstation. With reference to FIG. 20, such an implementation might employ, for example, a processor 2002, a memory 2004, and an input and/or output interface formed, for example, by a display 2006 and a keyboard 2008. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 2002, memory 2004, and input and/or output interface such as display 2006 and keyboard 2008 can be interconnected, for example, via bus 2010 as part of a data processing unit 2012. Suitable interconnections, for example via bus 2010, can also be provided to a network interface 2014, such as a network card, which can be provided to interface with a computer network, and to a media interface 2016, such as a diskette or CD-ROM drive, which can be provided to interface with media 2018.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 2018) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 2004), magnetic tape, a removable computer diskette (for example, media 2018), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 2002 coupled directly or indirectly to memory elements 2004 through a system bus 2010. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 2008, displays 2006, pointing devices, and the like) can be coupled to the system either directly (such as via bus 2010) or through intervening I/O controllers (omitted for clarity).

Network adapters such as network interface 2014 may also be coupled to the system to enable the data processing system to become coupled to other data processing systems or remote printers or storage devices through intervening networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide at least one beneficial effect, such as, for example, execution models of middleware containers at multiple levels of granularity.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for co-relating multiple functional designs and multiple implementation artifacts of multiple applications with multiple infrastructure components of a target deployment environment for the applications, comprising the steps of:

obtaining the multiple functional designs and the multiple implementation artifacts of the multiple applications, said obtaining carried out via a module executing on a hardware processor;

obtaining the multiple infrastructure components of the target deployment environment for the multiple applications, said obtaining carried out via a module executing on the hardware processor;

co-relating the multiple functional designs and the multiple implementation artifacts of the multiple applications with the multiple infrastructure components of the target deployment environment for the multiple applications, said co-relating carried out via a module executing on the hardware processor, and wherein co-relating comprises:
  (i) automatically discovering multiple system level dependencies among the multiple functional designs and the multiple implementation artifacts and the multiple infrastructure components, and
  (ii) providing one or more placement directives for deploying the multiple implementation artifacts on the target deployment environment;
generating a multi-layer graph on-demand based on said multiple system level dependencies among the multiple functional designs and the multiple implementation artifacts and the multiple infrastructure components, wherein nodes of the multi-layered graph comprise the multiple functional designs and the multiple implementation artifacts and the multiple infrastructure components, wherein edges of the multiple layered graph comprise the multiple system level dependencies, and wherein said generating comprises incrementally creating, on-demand, the multi-layered graph by resolving one or more queries and fetching one or more items of desired data related to the one or more queries at run-time;
providing at least one stitching relationship among the multiple functional designs, the multiple implementation artifacts, and the multiple infrastructure components;
processing at least one submitted query by using information from multiple meta-models by traversing the at least one stitching relationship to decompose at the least one submitted query into at least one sub-query on appropriate models; and
directing the at least one sub-query to at least one respective model via at least one source connector to retrieve information from at least one actual source.

2. The method of claim 1, further comprising answering a query of at least one run-time implication of a design in terms of at least one potential resource consumed by at least one operation of a designed artifact.

3. The method of claim 1, further comprising answering a query of at least one enterprise implication of at least one infrastructure observation.

4. The method of claim 1, further comprising answering a query of at least one enterprise implication of at least one issue comprising at least one of an exception, a monitored event and a failure.

5. A system for co-relating multiple functional designs and multiple implementation artifacts of multiple applications with multiple infrastructure components of a target deployment environment for the applications, comprising:
a memory; and
a processor coupled to the memory;
multiple source connectors, wherein each source connector imports at least one respective model from a source and wherein the source is at least one of a design tool, a file system and an infrastructure component, said multiple source connectors executing on the processor;
multiple meta-models, wherein each meta-model captures semantics of a corresponding model in terms of at least one of entity type, relationship type and behavior of a given kind of model, said multiple meta-models executing on the processor;
at least one stitching relationship among at least one element of the multiple meta-models that describe at least one relationship among a set of multiple meta-model elements from the multiple meta-models that are semantically related; and
a synthesizer that
  (i) integrates multiple input models comprising at least one or more placement directives for deploying the multiple implementation artifacts on the target deployment environment;
  (ii) generates a multi-layered graph on-demand based on said multiple input models, wherein nodes of the multi-layered graph comprise model elements of said multiple input models, wherein edges of the multi-layered graph comprise relations between the model element, and wherein said generating comprises incrementally creating, on-demand, the multi-layered graph by resolving one or more queries and fetching one or more items of desired data related to the one or more queries at run-time, said synthesizer executing on the processor;
  (iii) processes at least one submitted query by using information from the multiple meta-models by traversing the at least one stitching relationship to decompose the at least one submitted query into at least one sub-query on appropriate models; and
  (iv) directs the at least one sub-query to at least one respective model via the at least one of the multiple source connectors to retrieve information from at least one actual source.

6. The system of claim 5, wherein at least one new meta-model is added to the system and related to the multiple meta-models by adding at least one appropriate stitching relationship.

7. The system of claim 5, wherein the multiple input models comprise at least one of at least one functional design and implementation artifact, and a model of at least one property and contents of at least one component of the target infrastructure.

8. The system of claim 7, wherein each model comprises at least one specific entity and relationships describing at least one of structure and behavior of at least one of at least one functional design artifact, a target infrastructure component, and at least one placement directive.

9. The system of claim 5, wherein the multiple meta-models comprises:
multiple meta-models of at least one structure and behavior of typical development artifact in a service-oriented architecture (SOA) system.

10. The system of claim 9, wherein the multiple meta-models of the at least one structure and behavior of typical development artifact in the SOA system comprise at least one of at least one definition of a business process execution language (BPEL) process, at least one web service and at least one implementation artifact of the at least one web service.

11. The system of claim 5, wherein the multiple meta-models comprises:
multiple meta-models of at least one structure and behavior of infrastructure component.

12. The system of claim 11, wherein the multiple meta-models of the at least one structure and behavior of infrastructure component comprise at least one of a process server, a web container and a managed object container in an application server.

13. The system of claim 5, wherein the multiple meta-models comprises:
multiple meta-models of at least one structure and behavior of management facility for at least one infrastructure component and at least one functional component, wherein each meta-model describes at least one of structure and behavior of at least one model admitted by the meta-model.

14. The system of claim 5, wherein semantics of the at least one stitching relationship and semantics of at least one relationship used in the multiple meta-models are at least one of expressed in an executable rules language and interpreted by at least one suitable forward and backward-chaining traversal algorithm implemented in a conventional programming language.

15. The system of claim 5, wherein the synthesizer comprises a rules execution engine to interpret and reason with at least one rule to implement query decomposition processing.

16. The system of claim 5, wherein the multiple meta-models and the at least one stitching relationship are translated into at least one rule in an executable rules language.

17. A computer program product comprising a non-transitory tangible computer readable recordable storage medium including computer useable program code for co-relating multiple functional designs and multiple implementation artifacts of multiple applications with multiple infrastructure components of a target deployment environment for the applications, wherein the computer useable program code comprises one or more distinct software modules, the computer program product including:
the computer useable program code for obtaining the multiple functional designs and the multiple implementation artifacts of the multiple applications;
the computer useable program code for obtaining the multiple infrastructure components of the target deployment environment for the multiple applications;
the computer useable program code for co-relating the multiple functional designs and the multiple implementation artifacts of the multiple applications with the multiple infrastructure components of the target deployment environment for the multiple applications, wherein said co-relating comprises:
(i) automatically discovering multiple system level dependencies among the multiple functional designs and the multiple implementation artifacts and the multiple infrastructure components, and
(ii) providing one or more placement directives for deploying the multiple implementation artifacts on the target deployment environment;
the computer useable program code for generating a multi-layer graph on-demand based on said multiple system level dependencies among the multiple functional designs and the multiple implementation artifacts and the multiple infrastructure components, wherein nodes of the multi-layered graph comprise the multiple functional designs and the multiple implementation artifacts and the multiple infrastructure components, wherein edges of the multiple layered graph comprise the multiple system level dependencies, and wherein said generating comprises incrementally creating, on-demand, the multi-layered graph by resolving one or more queries and fetching one or more items of desired data related to the one or more queries at run-time;
the computer useable program code for providing at least one stitching relationship among the multiple functional designs, the multiple implementation artifacts, and the multiple infrastructure components;
the computer useable program code for processing at least one submitted query by using information from multiple meta-models by traversing the at least one stitching relationship to decompose the at least one submitted query into at least one sub-query on appropriate models; and
the computer useable program code for directing the at least one sub-query to at least one respective model via at least one source connector to retrieve information from at least one actual source.

18. A system for co-relating multiple functional designs and multiple implementation artifacts of multiple applications with multiple infrastructure components of a target deployment environment for the applications, comprising:
a memory; and
at least one processor couple to the memory and operative to:
obtain the multiple functional designs and the multiple implementation artifacts of the multiple applications;
obtain the multiple infrastructure components of the target deployment environment for the multiple applications;
co-relate the multiple functional designs and the multiple implementation artifacts of the multiple applications with the multiple infrastructure components of the target deployment environment for the multiple applications, wherein said co-relating comprises:
(i) automatically discovering multiple system level dependencies among the multiple functional designs and the multiple implementation artifacts and the multiple infrastructure components, and
(ii) providing one or more placement directives for deploying the multiple implementation artifacts on the target deployment environment;
generate a multi-layer graph on-demand based on said multiple system level dependencies among the multiple functional designs and the multiple implementation artifacts and the multiple infrastructure components, wherein nodes of the multi-layered graph comprise the multiple functional designs and the multiple implementation artifacts and the multiple infrastructure components, wherein edges of the multiple layered graph comprise the multiple system level dependencies, and wherein said generating comprises incrementally creating, on-demand, the multi-layered graph by resolving one or more queries and fetching one or more items of desired data related to the one or more queries at run-time;
provide at least one stitching relationship among the multiple functional designs, the multiple implementation artifacts, and the multiple infrastructure components;
process at least one submitted query by using information from multiple meta-models by traversing the at least one stitching relationship to decompose at the least one submitted query into at least one sub-query on appropriate models; and
direct the at least one sub-query to at least one respective model via at least one source connector to retrieve information from at least one actual source.

* * * * *